(12) United States Patent
Blalock

(10) Patent No.: US 7,206,076 B2
(45) Date of Patent: Apr. 17, 2007

(54) THICKNESS MEASUREMENT OF MOVING WEBS AND SEAL INTEGRITY SYSTEM USING DUAL INTERFEROMETER

(75) Inventor: Todd F. Blalock, Penfield, NY (US)

(73) Assignee: Lumetrics, Inc., W. Henrietta, NY (US)

( * ) Notice: Subject to any disclaimer, the term of this patent is extended or adjusted under 35 U.S.C. 154(b) by 344 days.

(21) Appl. No.: 10/981,177

(22) Filed: Nov. 4, 2004

(65) Prior Publication Data
US 2005/0151977 A1    Jul. 14, 2005

Related U.S. Application Data

(60) Provisional application No. 60/517,331, filed on Nov. 4, 2003.

(51) Int. Cl.
   *G01B 11/02* (2006.01)
   *G01B 9/02* (2006.01)
(52) U.S. Cl. .................. 356/503; 356/479; 356/482; 356/497
(58) Field of Classification Search .............. 356/479, 356/482, 497, 500, 503, 504
See application file for complete search history.

(56) References Cited

U.S. PATENT DOCUMENTS

| | | | | |
|---|---|---|---|---|
| 5,610,716 A | * | 3/1997 | Sorin et al. | 356/479 |
| 6,038,027 A | * | 3/2000 | Marcus et al. | 356/503 |
| 6,067,161 A | * | 5/2000 | Marcus et al. | 356/503 |
| 6,743,338 B2 | * | 6/2004 | Graeffe et al. | 162/198 |
| 6,801,321 B1 | * | 10/2004 | Du-Nour | 356/504 |
| 6,930,782 B1 | * | 8/2005 | Yi et al. | 356/504 |

\* cited by examiner

*Primary Examiner*—Gregory J. Toatley, Jr.
*Assistant Examiner*—Michael A. Lyons
(74) *Attorney, Agent, or Firm*—Reed Smith LLP

(57) ABSTRACT

A system and method for measuring the thickness of materials and coatings across a moving length of material such as sheet, film, or web by the use of non-contact optical interferometry is provided. Also, a system and method for evaluating the seal integrity in flexible packaging across a moving web by the use of non-contact optical interferometry is provided. Measurement of optical density and thickness, and the combination of various measurements in the production and process of manufacturing materials such as flexible packaging items that involve moving webs of material is disclosed. The present invention concerns the system and method involved in the collection and interpretation of data for these measurements and inspections.

16 Claims, 20 Drawing Sheets

THICKNESS MEASUREMENT OF MOVING WEBS AND SEAL INTEGRITY SYSTEM USING DUAL INTERFEROMETER

This application claims priority from U.S. Provisional Application Ser. No. 60/517,331, filed Nov. 4, 2003.

FIELD OF THE INVENTION

The present invention relates to the measurement of thickness (physical properties) of materials and coatings across a moving length of material such as sheet, film, or web and the evaluation of seal integrity in flexible packaging across a moving web by the use of non-contact optical interferometry. The present invention also relates to the measurement of optical density and thickness, and the combination of various measurements in the production and process of manufacturing materials such as flexible packaging items that involve moving webs of material. The present invention may be used for measurement and inspection of stationary objects as well. The present invention concerns the method and apparatus involved in the collection and interpretation of data for these measurements and inspections.

BACKGROUND OF THE INVENTION

There are many times in the industrial process where it is advantageous to know the thicknesses (physical properties) of the material that is being produced. In the case of multilayered plastics or coated cloths and papers, substantial savings of materials may be achieved if the thickness of the layers and coatings may be kept consistent and to a specific minimum. Additionally, solvents and coatings that are kept at the correct physical makeup may be applied in a consistent, measurable manner.

Currently in industrial processes there is no consistent manner to determine multilayer thicknesses of materials. Existing systems such as Beta gauges can determine total thickness of a material and use this as a base to calculate the approximate thickness of a coating. This method however requires multiple devices to first determine the average thickness of the base material and then subtract that measurement from the average total thickness to determine the coating thickness. Additional methods are being developed that use infrared technology to determine the total thickness of a material but this method does not allow for multilayer measurements of the material.

Furthermore, there are many times in the industrial process where it is advantageous to know the integrity of the seal on a product. Seal integrity is crucial in any case of a pouch that contains food, medical supplies, or any container in which contamination would compromise the contents. Substantial savings of materials due to scrap and downstream product waste may be achieved if the seal integrity and viability is available in a real time production environment. Of even more importance to some organizations is the reduction in risk due to continuous inspection of products.

Currently in industrial processes there is no consistent manner to determine seal integrity. Existing quality assurance systems primarily consist of off-line, random sampling systems. Testing may include filling product with air and then submerging in liquid to observe leaks, or where product is torn apart with a device that measures the force required to separate a seal. Other methods are based strictly on visual observation either by a mechanical device or human observation. Because of the random nature of these tests, many improperly sealed containers may be produced without the knowledge of the producing entity.

Methods of measuring thickness of a material using interferometric devices are known in the prior art. For example, U.S. Pat. No. 6,038,027, (Marcus et al.) and U.S. Pat. No. 6,067,161, (Marcus et al.), of which the entire disclosure of these patents is hereby referenced; concern the Method and Apparatus for determining a thickness profile of a moving material having at least two optical interfaces. These patents use an interferometric device and present an apparatus to maintain some consistency to the measurements obtained from the moving web but don't account for an in-process production system or the corresponding feedback to the processing controls of a production system. These patents also fail to use devices in the determination of seal integrity.

The present invention uses improvements to the interferometric device and the corresponding algorithms to improve data acquisition and measurement usablilty, and to accurately measure and predict seal integrity as a function of material thickness, misshapen seals, air and liquid gaps, and other characteristics that constitute a bad seal. The invention also incorporates multiple probe/optical sensor locations and purposes within a single system to provide complete process interpretation, feedback and control.

Various methods exist as part of the present invention for accommodating the movement of the web as it passes the measurement area. Some packaging systems require stages that transverse the web in a lateral fashion to measure the complete width, while others only measure single points along the moving web. The present invention will incorporate locations of multiple probes/optical sensors based on the specific equipment being attached to, and the container or pouch being measured, and these probes/optical sensors may be linked via optical switches to accomplish this measurement task.

SUMMARY OF THE INVENTION

An object of the present invention is to provide an improved method, in an industrial production environment, of determining total thickness of a moving web of material of various widths and thicknesses.

Another object is to provide an improved method, in an industrial production environment, of determining thickness of a coating or coatings applied to a moving web of material of various widths.

An additional object is to provide, in an industrial production environment, improved measurements of multi-layered materials along a moving web of various widths.

Another object is to provide, in an industrial production environment, an improved method for gathering data across a moving web of material of various widths using optical switches and multiple optical probes.

Another object is to provide a method of adjusting the length of fiber in an interferometric device by way of a fiber stretching system. The fiber stretching allows the device to match or mismatch fiber lengths to provide the maximum measurement thickness of materials.

Another object is to provide a reference surface within an optical probe to allow more accurate measurement of specific layers of material within an interferometric device.

Another object is to provide an improved set of algorithms that can calculate the thickness of multi-layered materials or coatings along a moving web of various widths.

Another object of the present invention is to provide an improved method, in an industrial production environment, of determining seal integrity of pouches using measurements of materials, on sealing areas, of a moving web of material of various widths and thicknesses. This method will detect thickness, misshapen seals, air and liquid gaps, and other characteristics that constitute a bad seal.

Another object is to provide an improved method, in an industrial production environment, of determining seal integrity of containers using measurements of materials, on sealing areas, applied to containers of various sizes and shapes. This method will detect thickness, misshapen seals, air and liquid gaps, and other characteristics that constitute a bad seal.

Another object is to provide, in an industrial production environment, an improved method for gathering data across a moving web of material of various widths, or from seals applied to containers of various sizes and shapes, using optical switches, staging platforms, and multiple optical probes.

Another object is to provide an improved set of algorithms that can calculate the thickness and optical characteristics of multi-layered materials, and detect misshapen seals, air and liquid gaps, and other characteristics that constitute a bad seal, both before and after a sealing function, along a moving web of various widths or from seals applied to containers of various sizes and shapes, and use this information in the calculation of seal integrity.

These objects are given only by way of illustrative example. Thus other desirable objectives and advantages inherently achieved by the disclosed invention may occur or become apparent to those skilled in the art.

BRIEF DESCRIPTION OF THE DRAWINGS

The previous and other objects, features, and advantages of the invention will be apparent from the following more particular description of the preferred embodiments of the invention, as illustrated in the accompanying drawings.

DETAILED DESCRIPTION OF THE INVENTION

The following is a detailed description of the embodiments of the invention, reference being made to the drawings, which outline the key components.

Apparatus and Method

Figure 1:
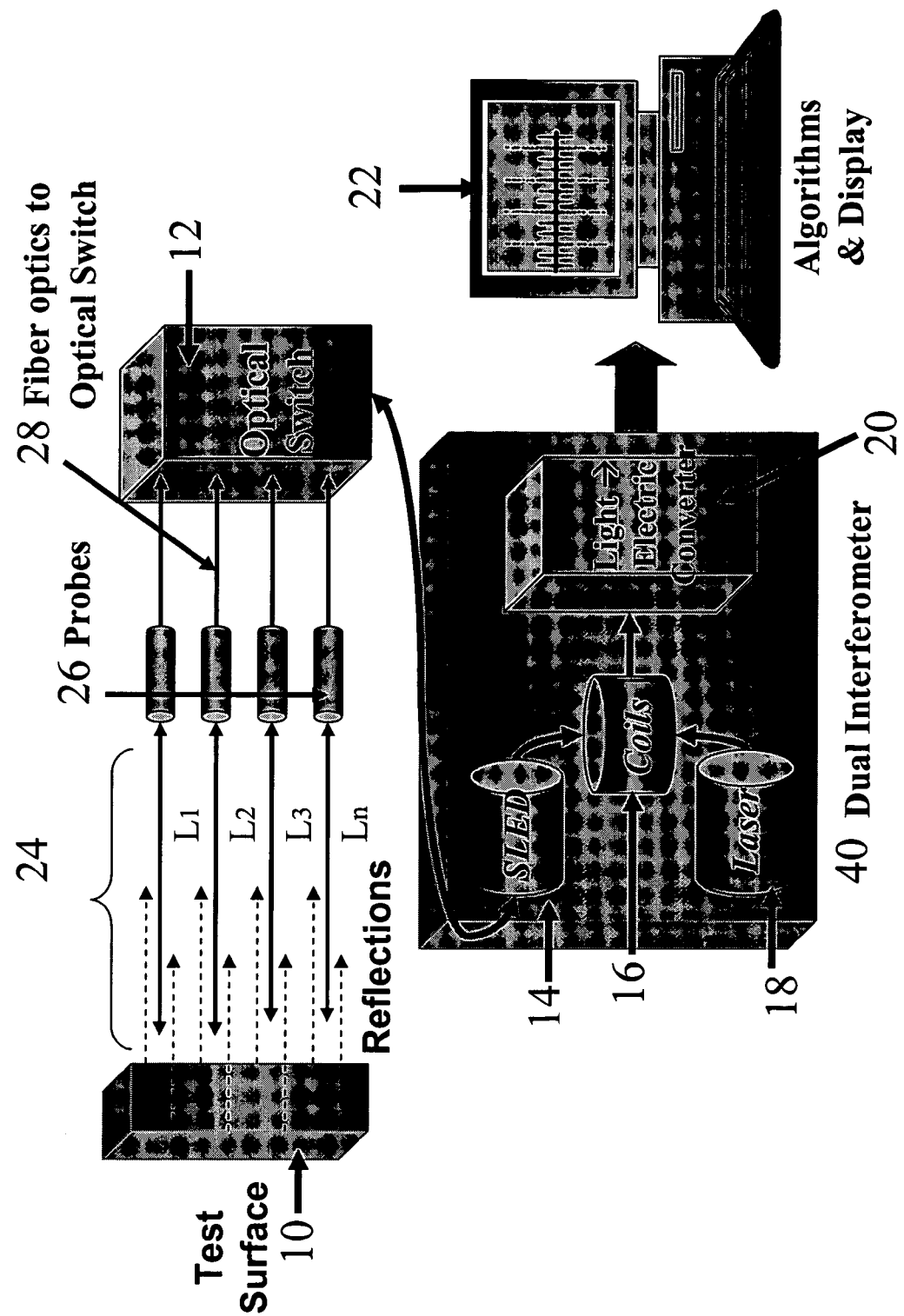
FIG. 1 and the preferred embodiment depicted therein, shows a graphical representation of a measurement system, including major components, for measuring material thickness profiles, misshapen seals, air and liquid gaps, and other characteristics that constitute a bad seal, in accordance with the present invention.

FIG. 1 and the preferred embodiment depicted therein, displays the major components of the system. The dual interferometer (40) is a standard Michelson type interferometer in Michelson mode or in autocorrelator mode (not shown). A suitable interferometer apparatus for use with measurement systems is disclosed in U.S. Pat. No. 5,659,392 (Marcus et al), and U.S. Pat. No. 5,596,409 (Marcus et al), of which the entire disclosure of this patent is hereby referenced, which describe an apparatus and method for measuring a thickness of material. The device illustrated in the patents are designed with a 1310 nanometer Superluminescent Light Emitting Diode (SLED) (14) and a 1550 nanometer laser (18) although SLEDs (14) and lasers (18) of various bandwidths may be used depending on various materials and thicknesses being scanned.

Figure 2:
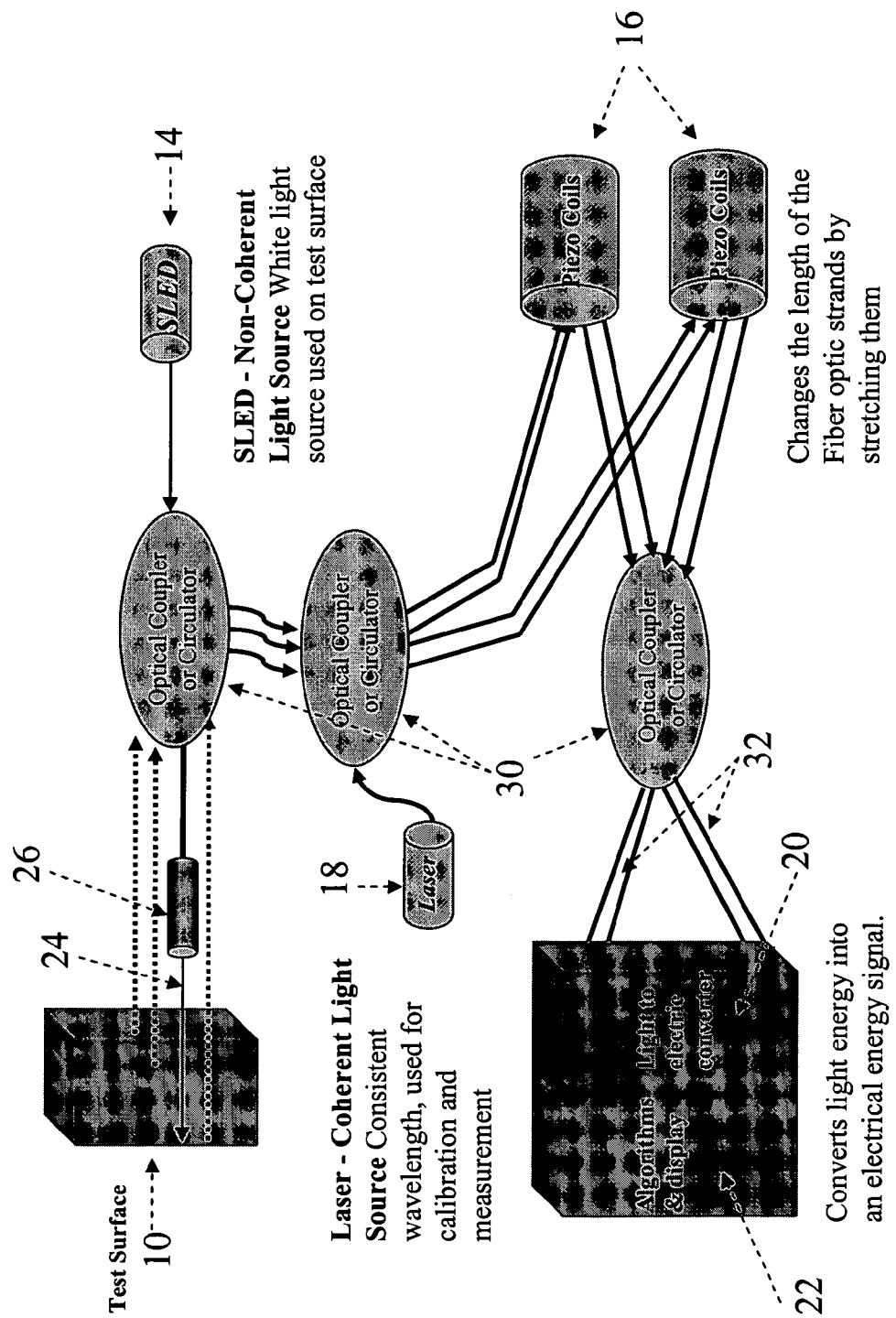
FIG. 2 and the preferred embodiment depicted therein, shows a graphical representation of the major components of the measurement system, and the path of light and electric signals to and from the test surface and through to the resulting end measurements, in accordance with the present invention.

Light travels from the SLED (14) to the Optical switch (12) where it is directed to various probes (26) indicated by locations L1–Ln. The optical switch is not required where a single probe (26) is needed in the basic iteration of the present invention but is recommended in more complicated applications where multiple measurements are required. Locations of probes are determined on a case by case basis relative to the types of measurements required and will be described in further diagrams. Light (24) is reflected off the multiple surfaces of the test surface (10) and these reflections (24) are projected back through the optical fiber (28) and combined with the laser light (18) through an optical coupler or circulator (30) and are then split between two piezo electric coils (16), as shown in FIG. 2, and the preferred embodiment depicted therein. The light is then directed through the light to electric converter (20) as shown in FIG. 1 and the preferred embodiment depicted therein, and then the resulting electrical signal is directed to the Personal Computer (22) where the algorithms (not shown) translate that information into precise physical measurements. The algorithms will be described later in this document.

As shown in FIG. 2, and the preferred embodiment depicted therein, an optical probe (26) directs light from a non-coherent light source, the SLED (14) towards a test surface (10). Non-coherent light is light that has a wavelength that does not retain a consistent pattern over time. Coherent light sources retain their wavelength pattern for extremely long periods.

Figure 14:
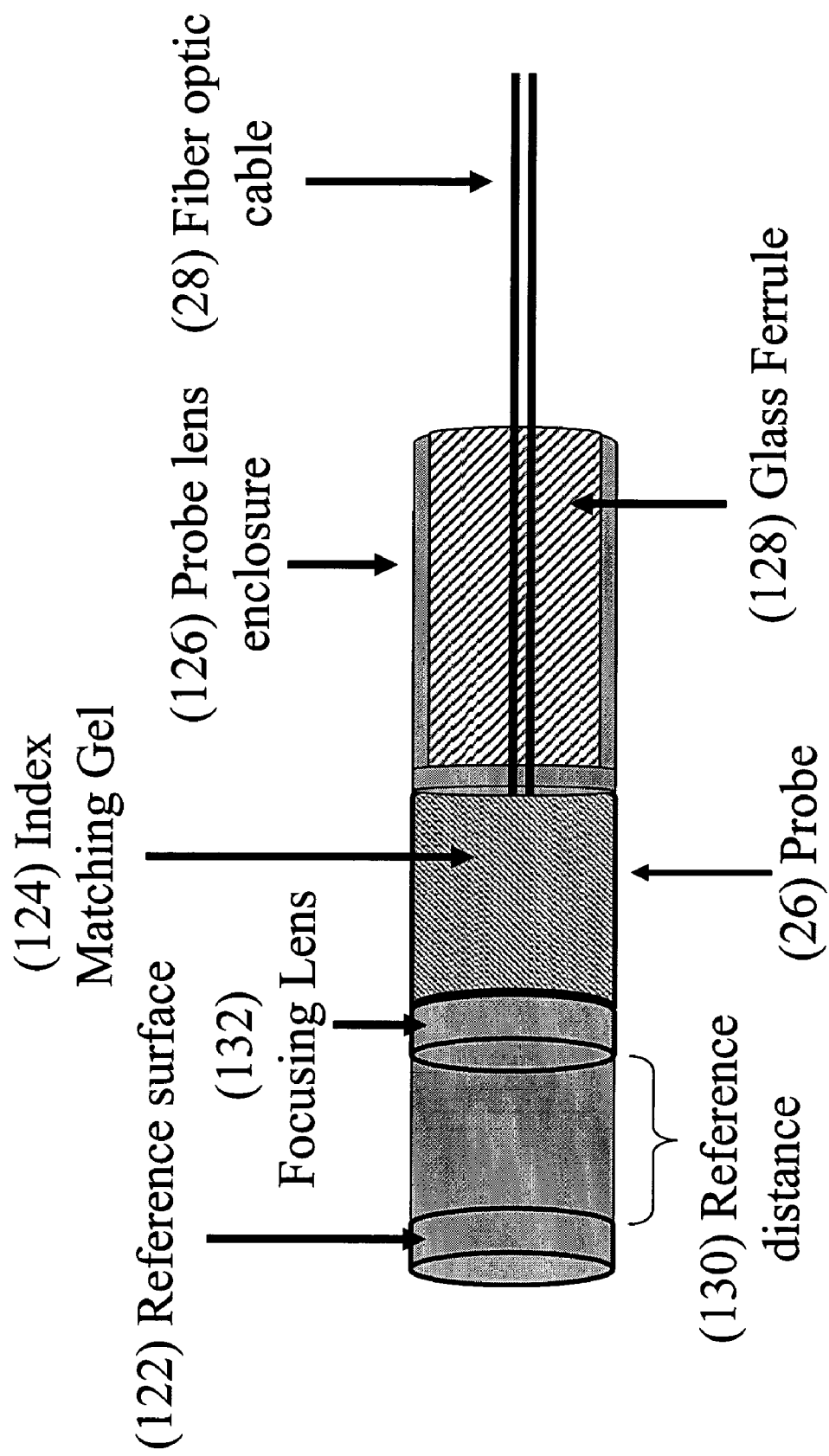
FIG. 14 and the preferred embodiment depicted therein, relates to the invention of an optical probe that provides a reference surface within an optical probe to allow more accurate measurement of specific layers of material within an interferometric device in an autocorrelator mode. This drawing shows the relative positioning of the lenses within the probe and an index matching gel to reduce back reflection.

As shown in FIG. 14, and the preferred embodiment depicted therein, the probe (26) consists of an enclosure (126) surrounding a glass ferule (128) that surrounds the incoming fiber optic cable (28). The fiber optic cable is positioned such that it terminates in a chamber of index matching gel (124). This gel reduces back reflection of the light source, SLED (14). The reference surface (122) is a specific distance from the focusing lens (132) and this distance is used within the algorithm calculations (not shown) to assist in the calculation of specific measurements. It also provides a first surface when measuring multi-layered materials.

As shown in FIG. 2, and the preferred embodiment depicted therein, the light from the SLED (14) is directed through the optical couplers or circulators (30) as required and split to the two piezo electric coils (16) which are "moving" in opposing directions, with one expanding while the other is contracting. This is done through electronic signaling. The opposing direction of the coils increases the scan length by a factor of two.

The light from both the SLED (14) and laser (18) are directed through the coils (16), reflected back through the coils (16) by a Faraday type mirror (not shown), and are then routed to a coupler or circulator (30) type device where the light waves are split again into coherent and non-coherent sources (32) and directed to their respective detectors (not shown). The detectors obtain the signal and then transfer this information to an analog to digital converter board (20) as shown on FIG. 2, and the preferred embodiment depicted therein. The resulting information is then transferred to the Personal Computer (22) where the algorithms translate the information into precise measurements. Alternatively, this conversion and signal processing and algorithm translation can be done within a digital signal-processing unit within the dual interferometer.

One way to measure the layers is described in U.S. Pat. No. 6,522,410, (Marcus et al) of which the entire disclosure of these patents is hereby referenced. In this strategy the sub-peaks are analyzed one at a time and the center position is found by performing a Fast Fourier Transform (FFT) of the shifted waveform. A Least Square Fit (LSF) is performed on the FFT phase subset and the true peak location is determined from the phase slope.

In the present invention a multi step process is performed to determine the peaks of an envelope.

1. Perform a Hilbert transform and obtain the Gaussian envelope.
2. Identify possible peaks, one way is by finding negative slope zero crossings of the derivative.
3. Use a threshold condition to identify the main peaks.
4. Use either a centroid around the peaks, or for more accurate peak position detection, use a peak finding algorithm that involves a second-order polynomial instead of a centroid. Polynomial curve fitting is preferred to centroid due to noise sensitivity.

Figure 15:
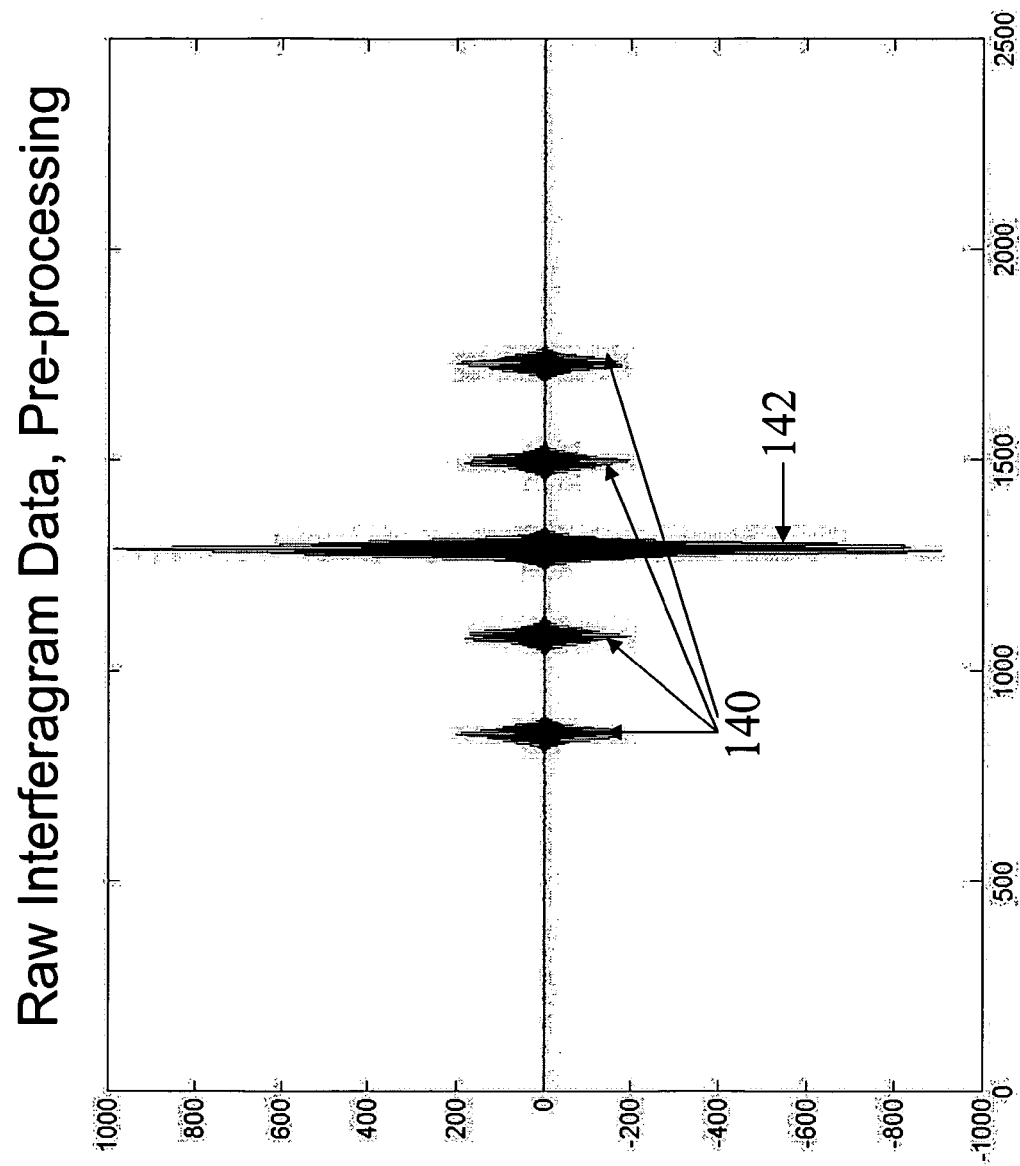
FIG. 15 and the preferred embodiment depicted therein, relates to the invention of mismatched fiber lengths expanding the dynamic range of an interferometric instrument, and shows raw interferogram data, pre-processing, of a multi-layer film as recorded on an oscilloscope.
Figure 16:
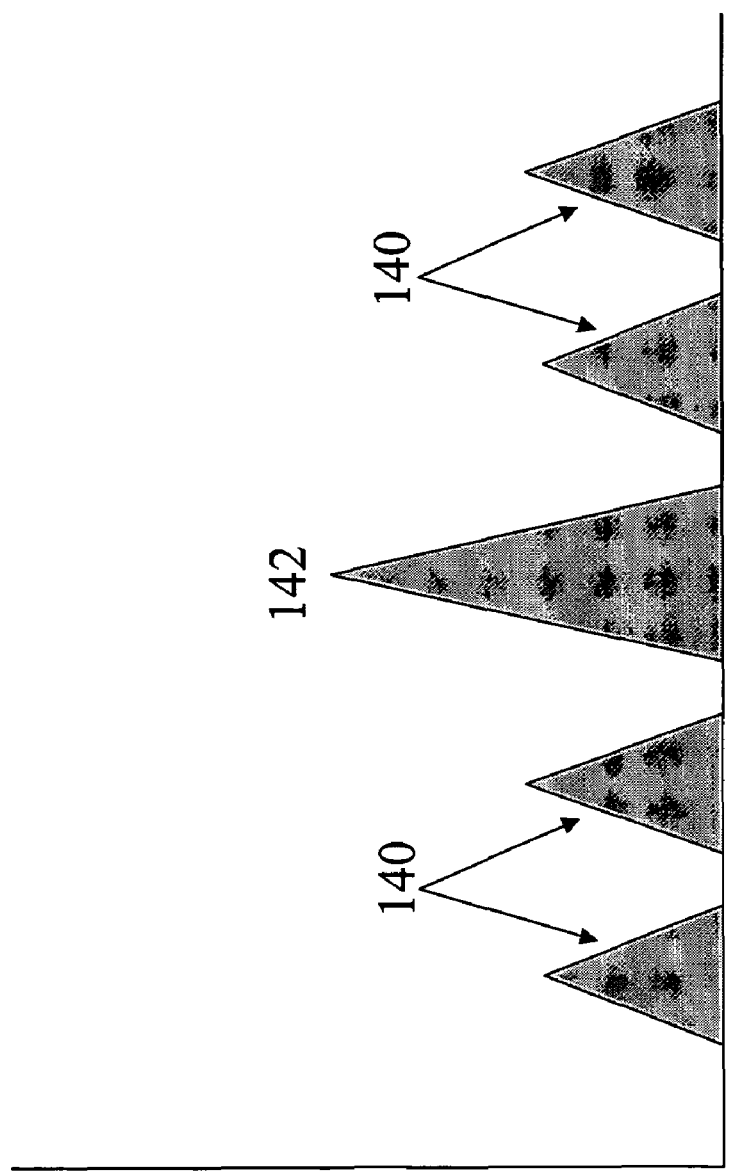
FIG. 16 and the preferred embodiment depicted therein, relates to the invention of mismatched fiber lengths expanding the dynamic range of an interferometric instrument, and shows the corresponding FIG. 15 graphical interpretation of the plotted peaks, post processing.

FIG. 15, and the preferred embodiment depicted therein, represents raw interferagram data, pre-processing, of a multi-layer film with a zero crossing (142) and two layers (140), as recorded on an oscilloscope (not shown). FIG. 16 represents the corresponding graphical interpretation of the plotted peaks, post processing, with a zero crossing (142) and two layers (140).

Figure 3:
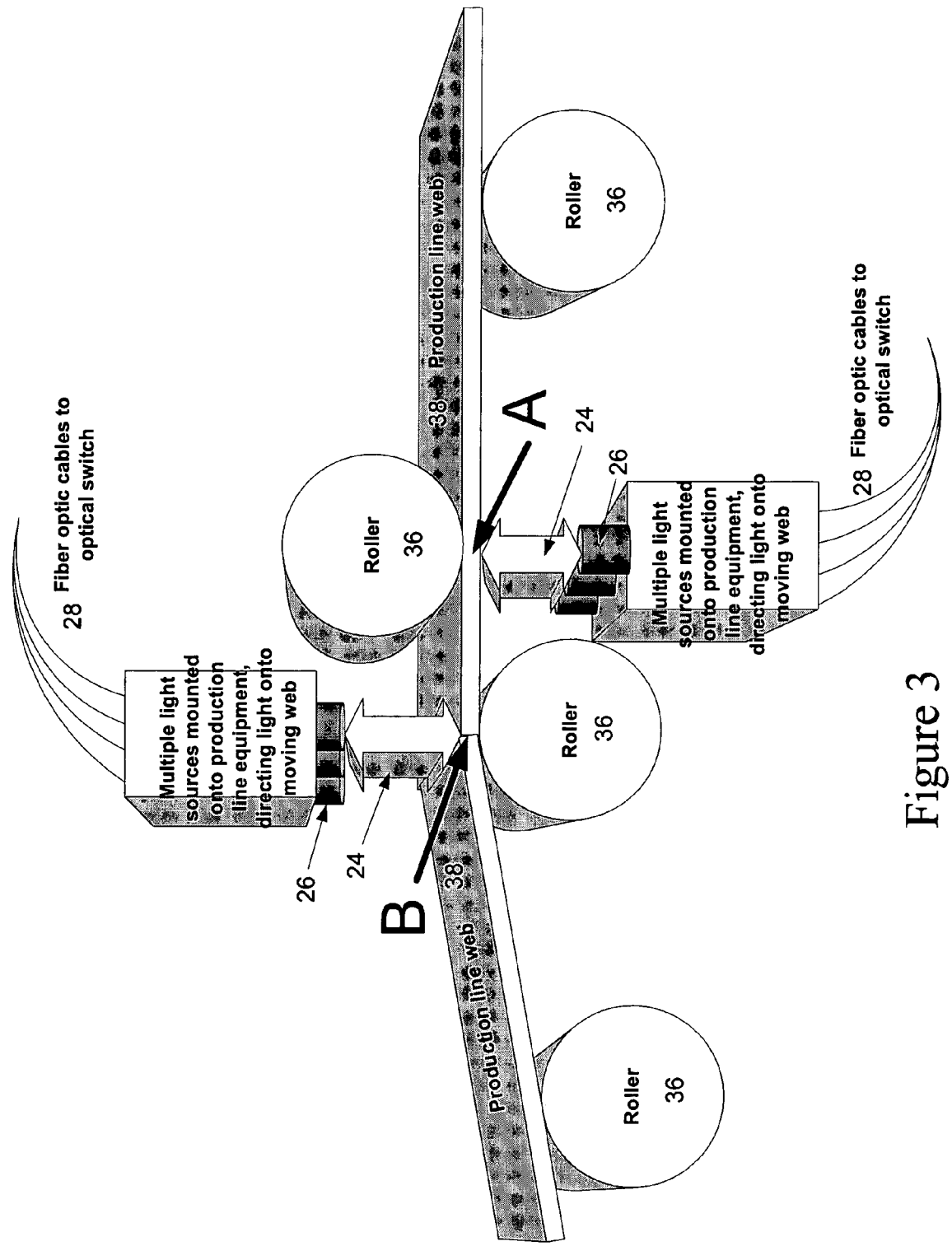
FIG. 3 and the preferred embodiment depicted therein, shows multiple light probe placement in relation to the roller placement along a generic web on a production line.

Specific to a moving web, FIG. 3, and the preferred embodiment depicted therein, represents a production line (not shown) with moving web (38) of no specific width but variable to any size. The production line may consist of rollers (36) and a moving web of material (38). The web may move at speeds of a few feet per minute to thousands of feet per minute. The material is consistent within any production line at any one time but the line may contain material of multiple sorts. In the case of plastic material, an extrusion system may be downstream providing the web. In the case of paper or foil, there may be some sort of extrusion system as well. Points A and B represent two locations that may provide accurate measuring points along the web.

Material of the web may be comprised of transparent, colored, partially opaque or completely opaque material (for example, an optical density less than 4 at the measured wavelength). If material is of a specified optical density only one probe (26) may be used. If the material has a barrier layer with an optical density greater than what may be pierced by the SLED then measurements may be obtained from both the top and bottom of the web as shown in FIG. 3, and the preferred embodiment depicted therein, at points A and B. The measurements taken from both the top of the web (B) and the bottom (A) may then be mathematically combined to calculate the multi-layer thicknesses. Other methods may be apparent for determining these thicknesses, to those experienced in the art, and they are within the scope of the present invention.

FIG. 3, and the preferred embodiment depicted therein, represents multiple probes (26) and light beams (24) represented by the arrows above point B and below point A. The number of probes (26) present may be from 1 to n and are restricted only by the type of optical switch (not shown) that is chosen. The optical switch (not shown) obtains samples from one probe (26) to the next, and the software running the switch may determine the order.

By using the switch, the system may sample at an extremely rapid rate. The restrictions are primarily driven by the Analog to Digital card (not shown) within the personal computer (not shown), the rate at which real time data may be processed or by the processing speed if analog to digital processing is done within a digital signal processor (DSP) within the Dual Interferometer, and by the speed of the optical switch. The current Analog to Digital card (not shown) has a sampling rate of up to 10 Kilohertz. Many switches currently sample every 20–40 milliseconds and this rate is expected to increase as optical switches mature. The present invention will accommodate faster sampling and processing as faster components and software become available. This method of obtaining multiple samples across a moving web is unique to this application.

The present invention is unique in that it has the advantage of being able to provide feedback to the manufacturing system in any process when manufacturing a moving web of plastic, or coating a moving web of any sort of material. As an example, currently, a process employing die-bolts regulates the total thickness and corresponding multi-layer thicknesses of cast film lines. Die-bolts are mechanical bolts that are attached to a metal plate and control the amount of material that is able to pass the plate and form the web. These die-bolts are currently controlled by heat, such that as they are heated they open the metal plate allowing more material to form on the web and create a thicker web, and as they are cooled less material is allowed to form on the web causing a thinner web.

Within the present invention is the ability to employ feedback to the control die-bolts. FIG. 3, and the preferred embodiment depicted therein, represents multiple probes (26) where a specific light probe (26) may be associated to a specific die-bolt (not shown) such that as a probe detects a thin layer or improper thickness it is able to provide feedback to a specific bolt or bolts. This feedback would be provided via software within the personal computer system (not shown). In other embodiments the present invention may be used in the blown film industry, the coating industry, or other industries or processes, in a similar manner although its form may differ. System information may be passed via control software or some combination of software and hardware, which is not shown here.

Figure 4:
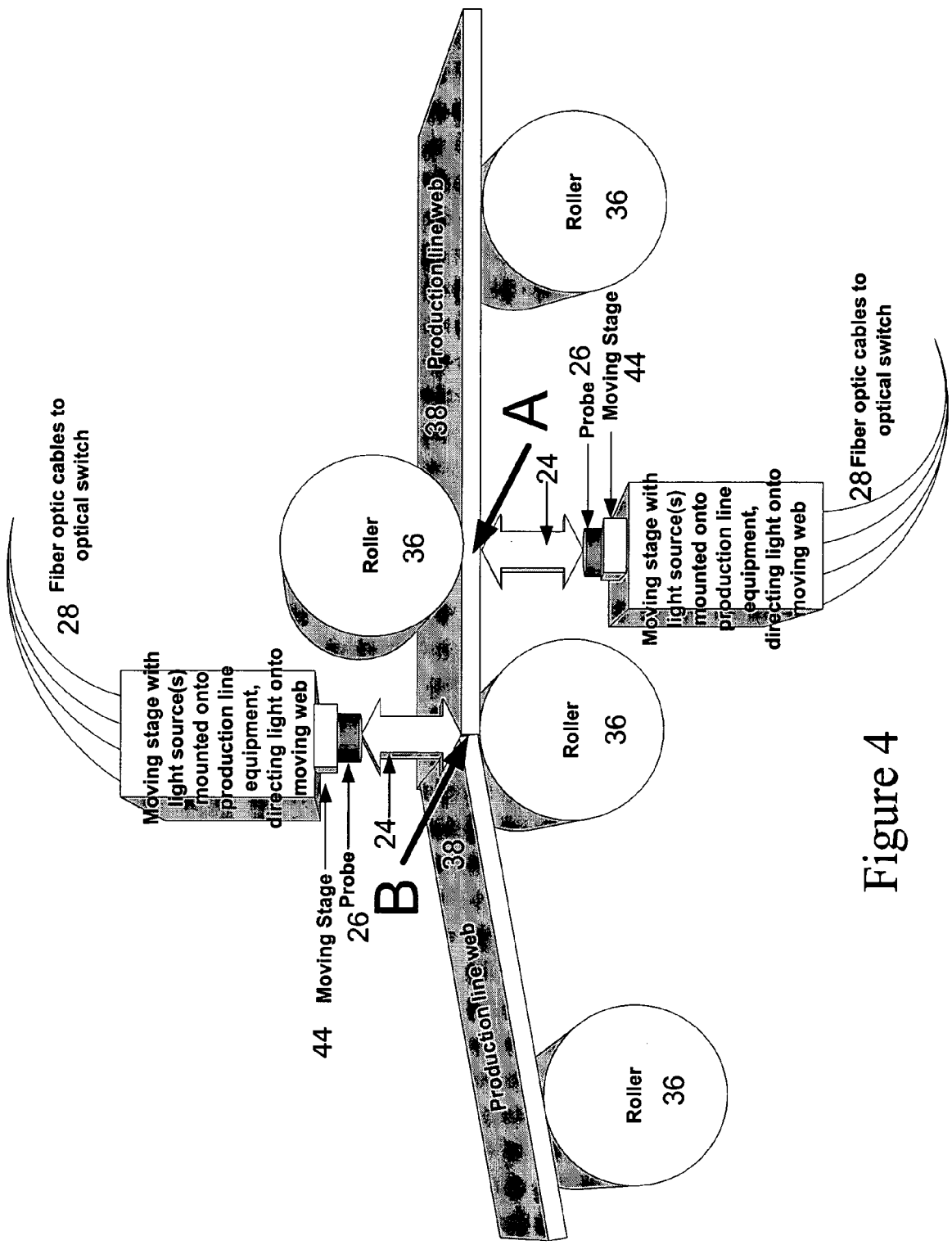
FIG. 4 and the preferred embodiment depicted therein, shows the light probe placement on a moving stage in relation to the roller placement along a generic web on a production line.

FIG. 4, and the preferred embodiment depicted therein, indicates a system where there is a movable stage (44) with a single or multiple probes (26) attached to it that are moved along the web (38) perpendicular to the general movement of the web. In this manner, the described invention provides less points of measurement along the moving web (38) and may provide an averaging algorithm (not shown) to determine the thickness of layers or total thickness of the web. Points A and B represent the location of the light source in relation to the moving stage (44) and web (38). The present invention may be used in the blown film industry or in the coating industry, in a similar manner although its form may differ.

FIG. 3, and FIG. 4 and the preferred embodiment depicted therein, also represent systems where a coating of some sort is applied to a moving web (38) where the present invention may measure the total thickness of this coating. One way, but not the only way, to make this measurement may be by determining the top of the coating and then detecting the bottom of the coating and mathematically calculating the thickness of the coating. Measurements may be conducted in the same fashion as described above.

Figure 5:
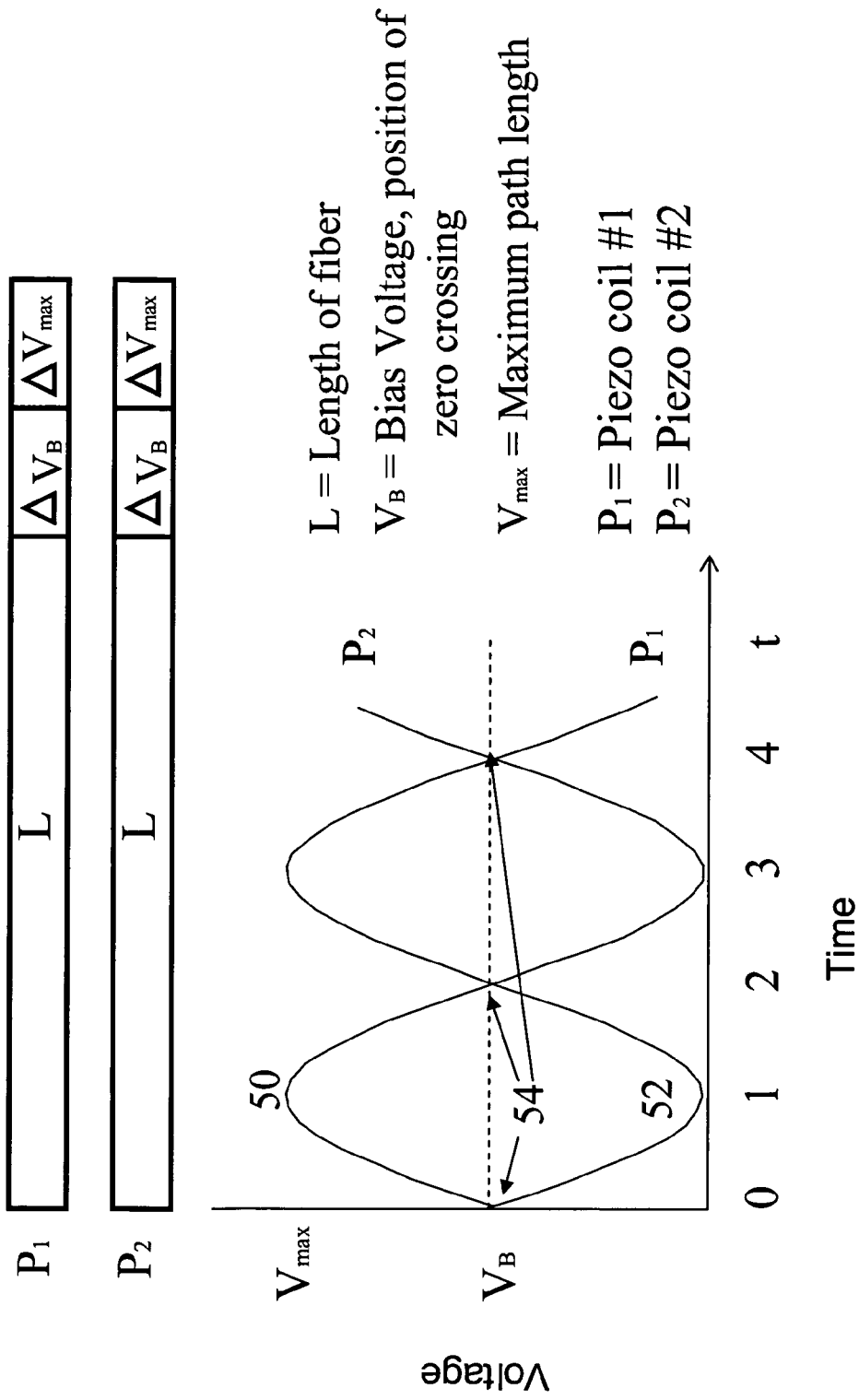
FIG. 5 and the preferred embodiment depicted therein, relates to the invention of mismatched fiber lengths expanding the dynamic range of an interferometric instrument and shows a typical interferometric device with a standard sine wave where both lengths of fiber from two piezo coils are equal and the resulting zero crossings.

FIG. 5, 6, 7, & 8, and the preferred embodiments depicted therein, refers to a method of adjusting the length of fiber in an interferometric device by way of a fiber stretching system. The fiber stretching allows the device to match or mismatch fiber lengths to provide the maximum measurement thickness of materials.

To understand the present invention it is helpful to understand issues around fiber length bias.
1. In a piezo coil, fiber stretch is determined by the amount of voltage applied to piezo coil.
2. For maximum dynamic range for a given maximum fiber stretch/voltage, a fiber length mismatch equal to the maximum stretch of the piezo fiber stretcher yields the maximum dynamic range.
3. Since it is difficult to cut a fiber to sub-millimeter accuracy, the present invention (static fiber stretcher) is required to eliminate the variable fiber length bias.

For optimum Optical Path Length Difference and maximum dynamic range (OPD) the following conditions must be met.
1. OPD=0 (for a zero crossing to occur)
2. OPD=Max (Maximum dynamic range)
3. $\alpha1$, $\alpha2$=Minimum stretch needed
4. $\alpha1=\alpha2$
5. Assume double pass configuration FIG. 15 and the preferred embodiment depicted therein, represents raw interferagram data, pre-processing; of a multi-layer film with a zero crossing (142) and two layers (140), as recorded on an oscilloscope.

FIG. 16 represents the corresponding graphical interpretation of the plotted peaks, post processing, with a zero crossing (142) and two layers (140).

FIG. 5, and the preferred embodiment depicted therein, refers to existing interferometric type devices. L represents the length of fiber in a piezo electric coil (not shown) and $V_B$ represents the point where the optical path lengths of each coil are equal (54) (called zero crossing) and $V_{max}$ represents the maximum path length of each coil. This figure depicts a system where both piezo 1 (52) and piezo 2 (50) are of equal length.

Figure 6:
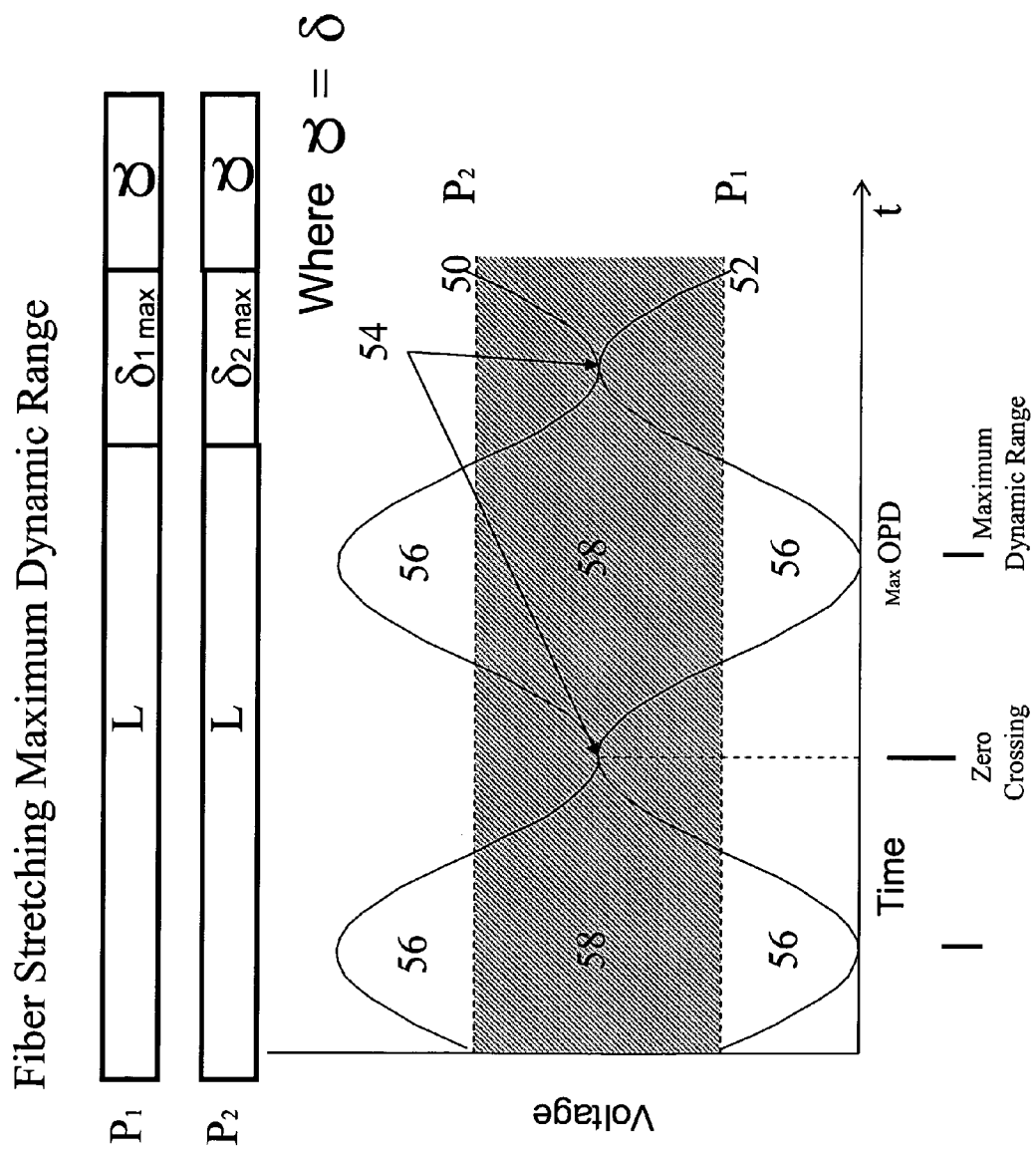
FIG. 6 and the preferred embodiment depicted therein, relates to the invention of mismatched fiber lengths expanding the dynamic range of an interferometric instrument and shows the sine waves where fiber stretching expands the dynamic range of an interferometric device.

FIG. 6, and the preferred embodiment depicted therein, shows both piezo coil sine waves (50, 52) where an adjustment of fiber lengths has been made to expand the dynamic range to the maximum amount. Observe the increased maximum dynamic range by combining previous dynamic range (56) with highlighted additional dynamic range (58) due to fiber stretching.

Figure 7:
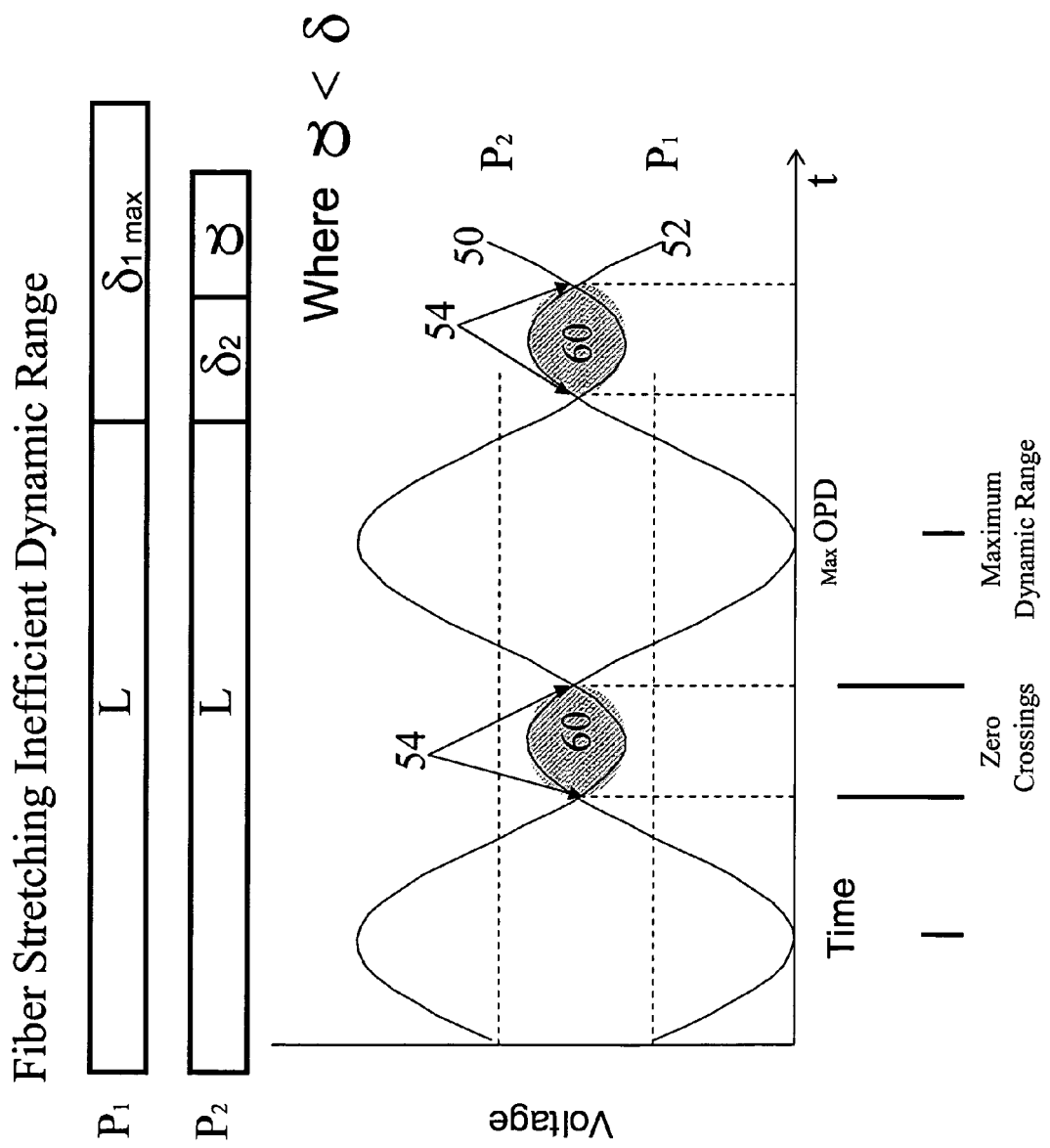
FIG. 7 and the preferred embodiment depicted therein, relates to the invention of mismatched fiber lengths expanding the dynamic range of an interferometric instrument and shows the sine waves where fiber mismatch shrinks the dynamic range of an interferometric device.

FIG. 7, and the preferred embodiment depicted therein, shows both piezo coil sine waves (50, 52) where there is a mismatch. This represents an inefficient dynamic range where the amount of mismatch is less than the total amount of stretch. In FIG. 7 multiple zero crossings (54) occur resulting in wasted data that cannot be used, represented by the shaded area 60.

Figure 8:
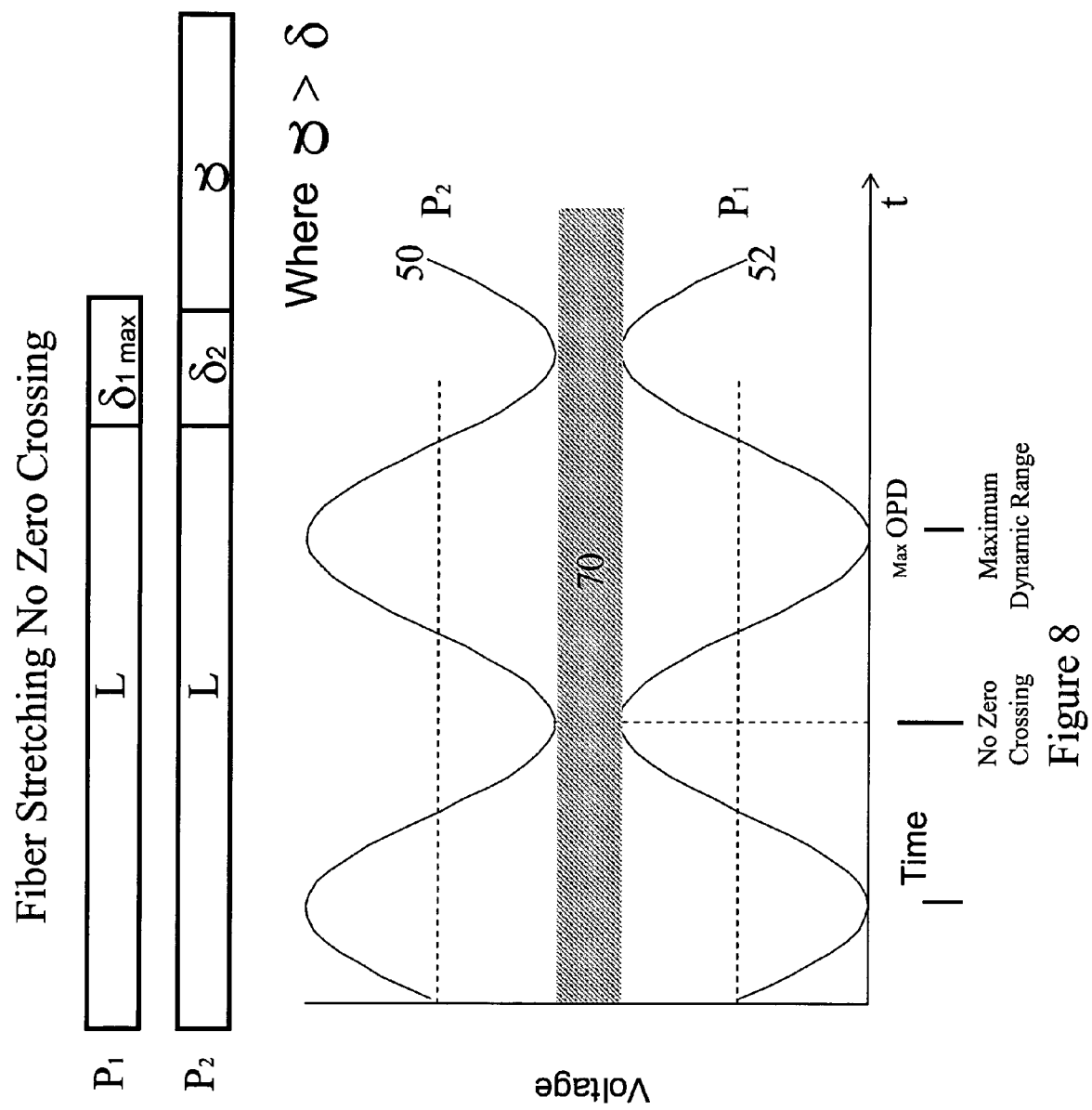
FIG. 8 and the preferred embodiment depicted therein, relates to the invention of mismatched fiber lengths expanding the dynamic range of an interferometric instrument and shows the sine waves where fiber mismatch causes there to be a lack of zero crossing in an interferometric device.

FIG. 8, and the preferred embodiment depicted therein, also shows both piezo coil sine waves (50, 52) where there is a mismatch. This represents a dynamic range where no zero crossing occurs and the amount of mismatch is greater than the total amount of stretch. In FIG. 8, no zero crossings occur resulting in lost data, represented by the shaded area 70.

Given that the fiber mismatch reduces the scan length of an interferometric device the present invention and the preferred embodiment depicted therein, outlines methods to adjust the fiber lengths in a mechanical manner. FIGS. 9, 10, 11, 12, and 13, and the preferred embodiment depicted therein, represent some methods to accomplish this adjustment and will be described in further detail. These are not the only ways to stretch the fiber but are representative methods. Those skilled in the arts could define other ways which are represented within the scope of the present invention. Within these descriptions the fiber stretcher may be applied to one or both of the fibers within the interferometric device, external to the interferometric device on the fiber to and from the probe or on another suitable location within the fiber system.

Figure 9:
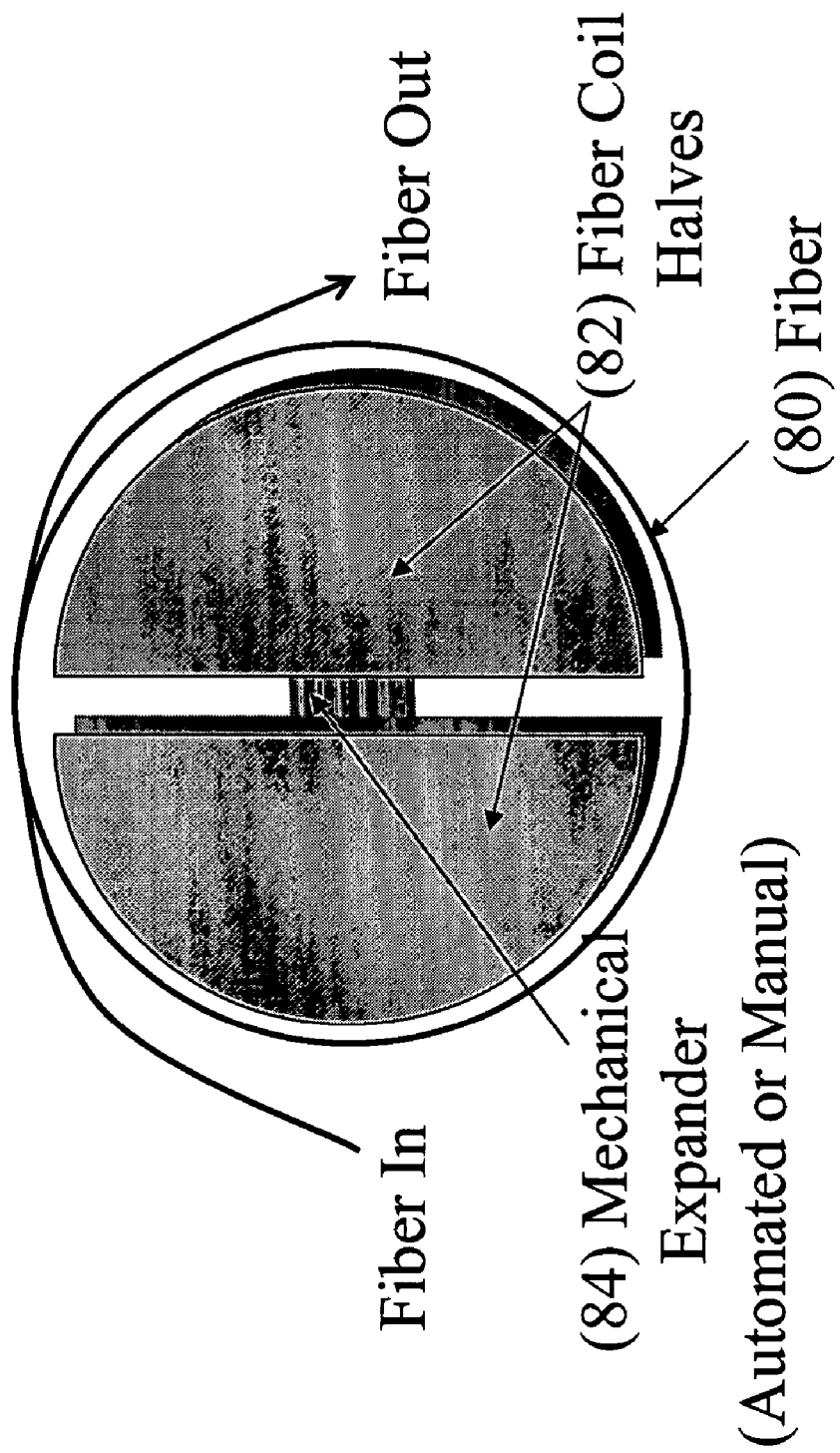
FIG. 9 and the preferred embodiment depicted therein, relates to the invention that provides a method of adjusting the length of fiber in an interferometric device by way of a fiber stretching system. This drawing shows a manual fiber-stretching coil.

FIG. 9, and the preferred embodiment depicted therein, represents one of multiple methods to adjust the fiber lengths in a mechanical manner. In this method, a fiber stretching adjustment coil is used to provide identical fiber lengths. A fiber (80) is coiled around two fiber coil halves (82). Between the fiber coil halves (82) is a mechanical expander (84) that forces the two halves apart, causing the fiber to stretch. The mechanical expander (84) can be of various types, shapes, and sizes and is important in that it forces the two halves to separate and stretch the fiber. The mechanical expander may be moved manually or by a mechanized device. Another variation, although not the only one, is to expand the fiber stretcher before winding the fiber and then wind the fiber pre-stretched. The mechanical expander may then be adjusted to allow the fiber to contract, changing the length of the fiber.

Figure 10:
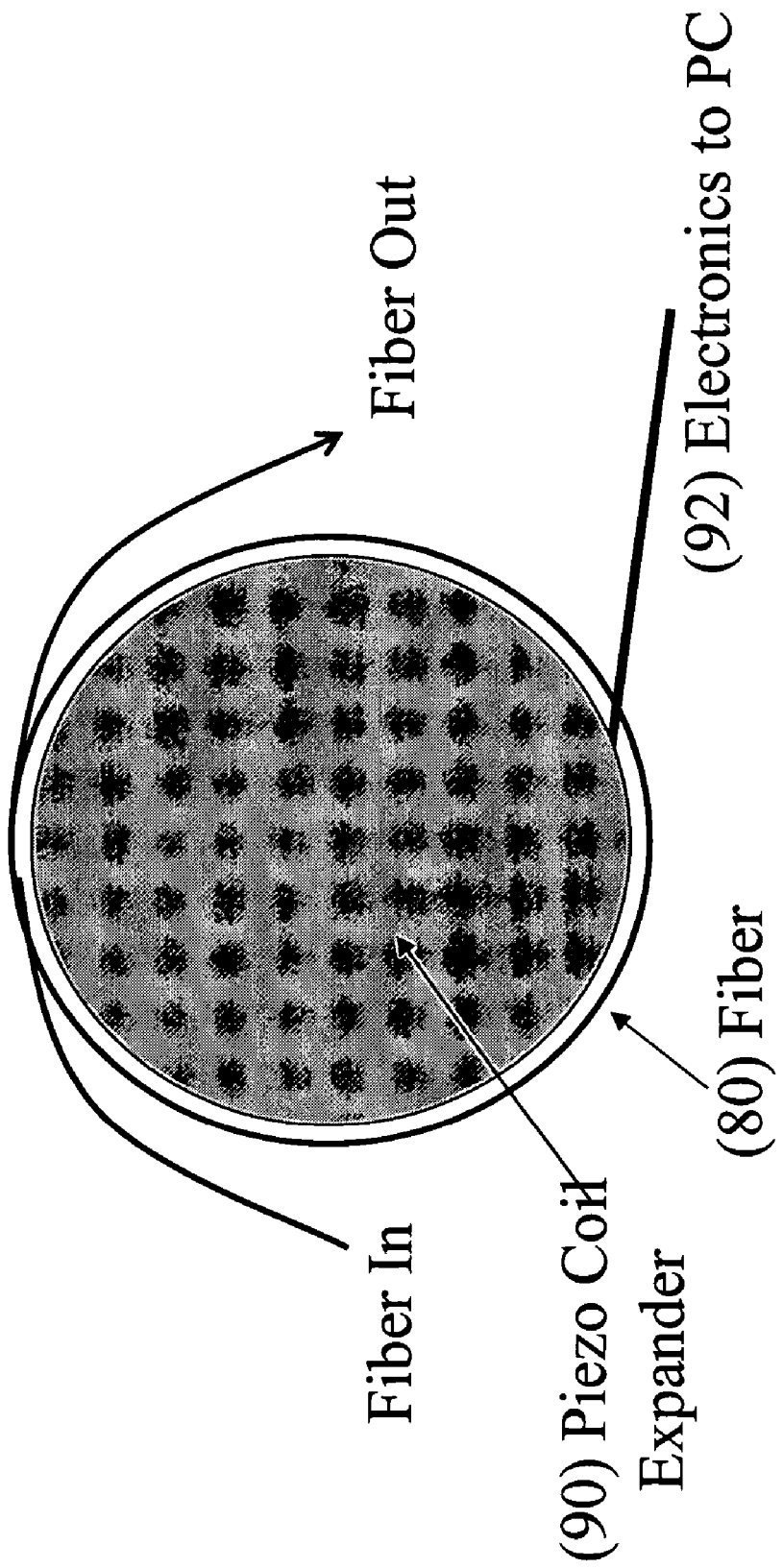
FIG. 10 and the preferred embodiment depicted therein, relates to the invention that provides a method of adjusting the length of fiber in an interferometric device by way of a fiber-stretching system. This drawing shows an electronic piezo coil adjustment device.

FIG. 10, and the preferred embodiment depicted therein, represents one of multiple methods to adjust the fiber lengths in a mechanical manner. In this method, a fiber stretching piezo adjustment coil is used to provide identical fiber lengths. A fiber (80) is coiled around a piezo coil expander (90). Electronics (92) are connected to the personal computer (not shown) that regulate the amount of expansion to the piezo coil, causing fiber expansion to the desired amount. Settings may automatically move the Piezo to the required dimension or a manual method with its user interface may be used. Another variation, although not the only one, is to expand the fiber stretcher before winding the fiber and then wind the fiber pre-stretched. The mechanical expander may then be adjusted to allow the fiber to contract, changing the length of the fiber.

Figure 11:
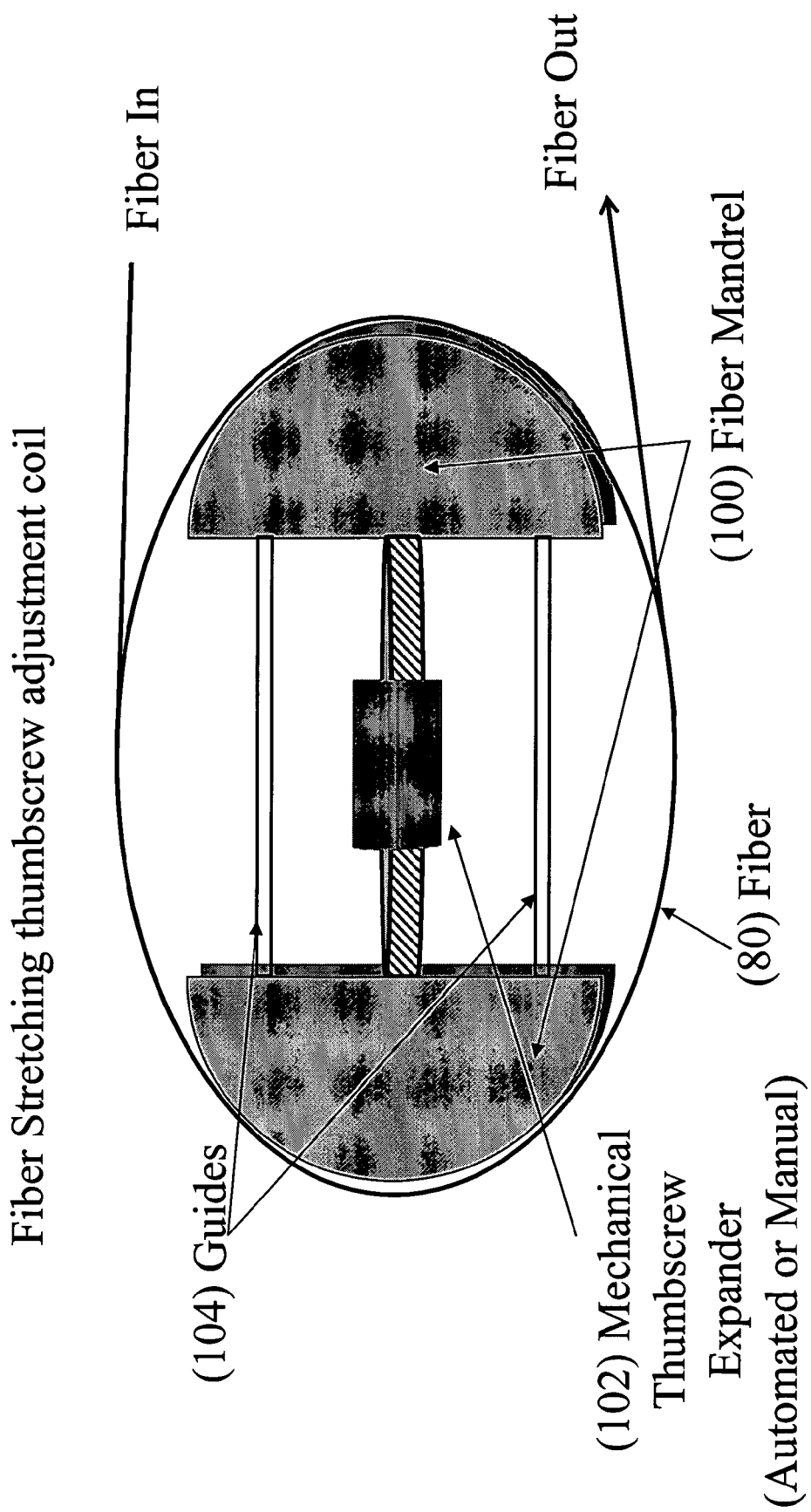
FIG. 11 and the preferred embodiment depicted therein, relates to the invention that provides a method of adjusting the length of fiber in an interferometric device by way of a fiber stretching system. This drawing shows a manual thumbscrew adjustment fiber-stretching coil.

FIG. 11, and the preferred embodiment depicted therein, represents one of multiple methods to adjust the fiber lengths in a mechanical manner. In this method, a fiber stretching thumbscrew adjustment coil is used to provide identical fiber lengths. A fiber (80) is coiled around the fiber mandrels (100). To accommodate torque and other forces, the mandrels (100) may be connected by various guides (104). Additionally, a mechanical thumbscrew (102) is provided to stretch or contract the device, causing a change in the length of the fiber. The mechanical thumbscrew may be moved manually or by a mechanized device. Another variation, although not the only one, is to expand the fiber stretcher before winding the fiber and then wind the fiber pre-stretched. The mechanical expander may then be adjusted to allow the fiber to contract, changing the length of the fiber.

Figure 12:
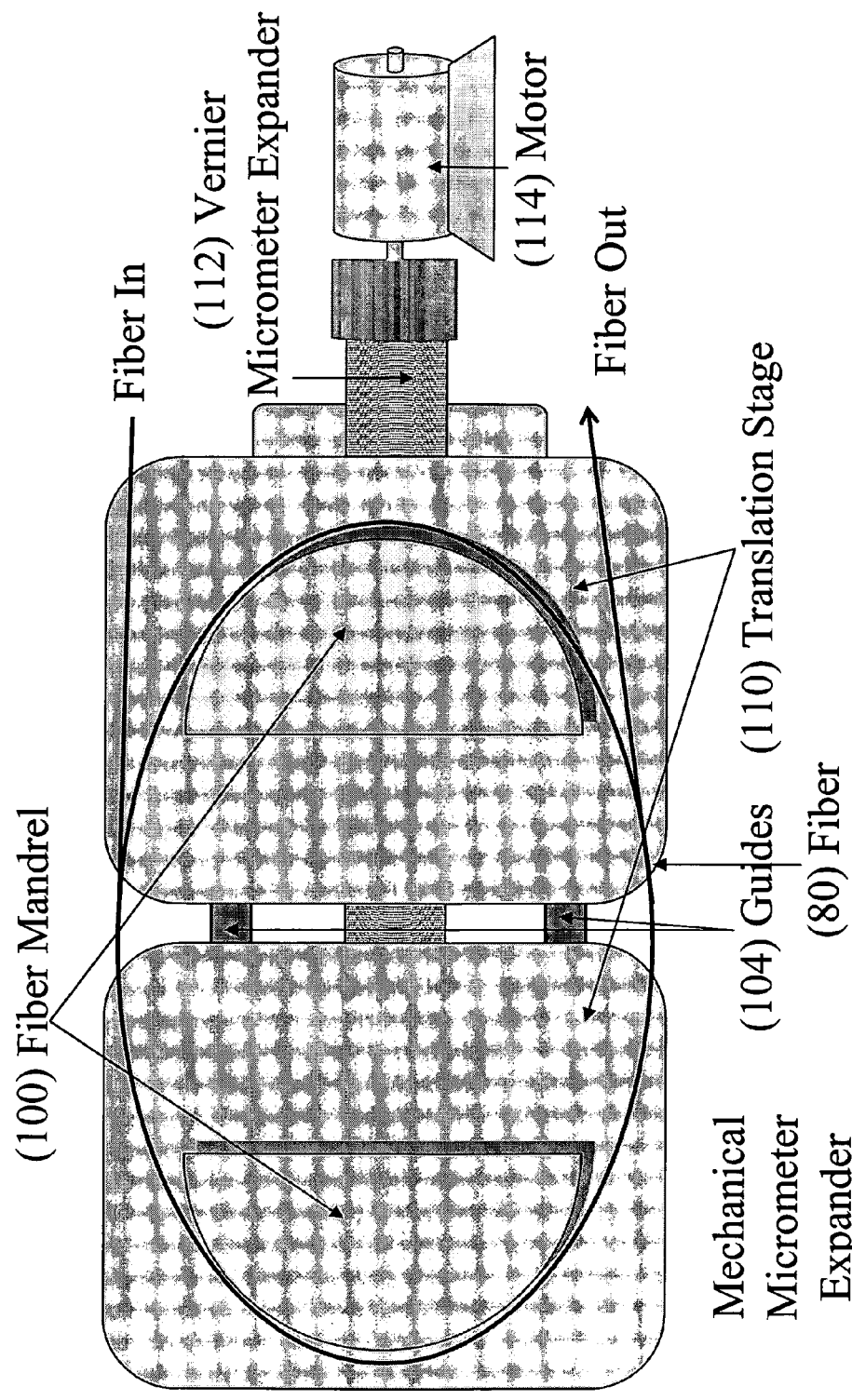
FIG. 12 and the preferred embodiment depicted therein, relates to the invention that provides a method of adjusting the length of fiber in an interferometric device by way of a fiber stretching system. This drawing shows a manual or automated Vernier micrometer adjustment fiber-stretching coil.

FIG. 12, and the preferred embodiment depicted therein, represents one of multiple methods to adjust the fiber lengths in a mechanical manner. In this method, a fiber stretching Vernier micrometer adjustment device is used to provide identical fiber lengths. A fiber (80) is coiled around the fiber mandrels (100), which are mounted on translation stages (110). To accommodate torque and other forces, the mandrels (100) and translation stages (110) may be connected by various guides (104). A Vernier micrometer expander type device (112) is used to expand or contract the device causing a change in fiber length. Adjustment may be made manually or through the use of a motor (114) of some size and type, or other automated mechanical method. Another variation, although not the only one, is to expand the fiber stretcher before winding the fiber and then wind the fiber pre-stretched. The mechanical expander may then be adjusted to allow the fiber to contract, changing the length of the fiber.

Figure 13:
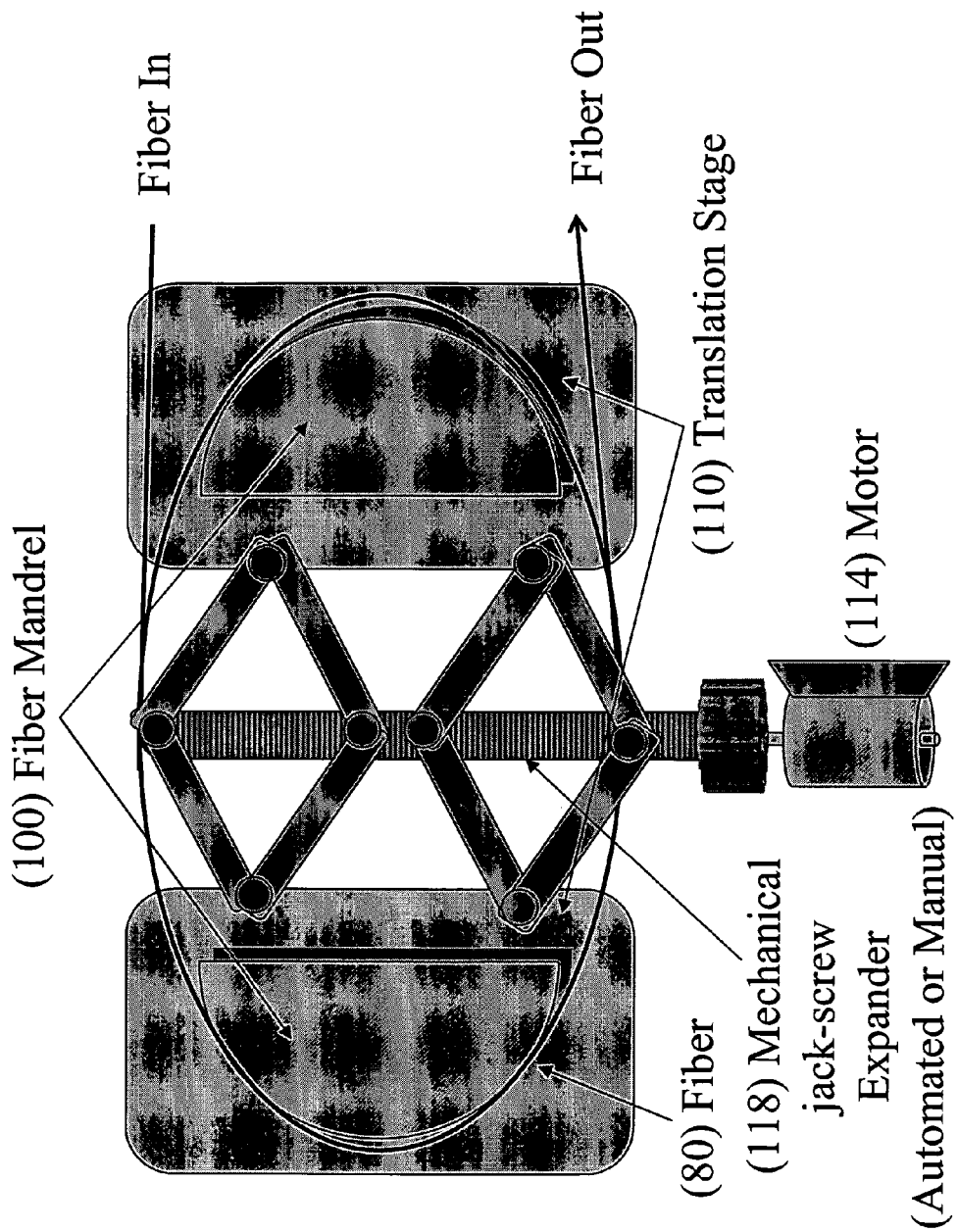
FIG. 13 and the preferred embodiment depicted therein, relates to the invention that provides a method of adjusting the length of fiber in an interferometric device by way of a fiber stretching system. This drawing shows a manual or automated jack-screw adjustment fiber stretching coil.

FIG. 13, and the preferred embodiment depicted therein, represents one of multiple methods to adjust the fiber lengths in a mechanical manner. In this method, a fiber stretching jack-screw adjustment device is used to provide identical fiber lengths. A fiber (80) is coiled around the fiber mandrels (100), which are mounted on translation stages (110). The translation stages are connected via a jack-screw type device (118) that is used to separate the stages, causing a change in fiber length. Adjustment may be made manually or through the use of a motor (114) of some size and type, or other automated mechanical method. Another variation, although not the only one, is to expand the fiber stretcher before winding the fiber and then wind the fiber pre-stretched. The mechanical expander may then be adjusted to allow the fiber to contract, changing the length of the fiber.

Figure 17:
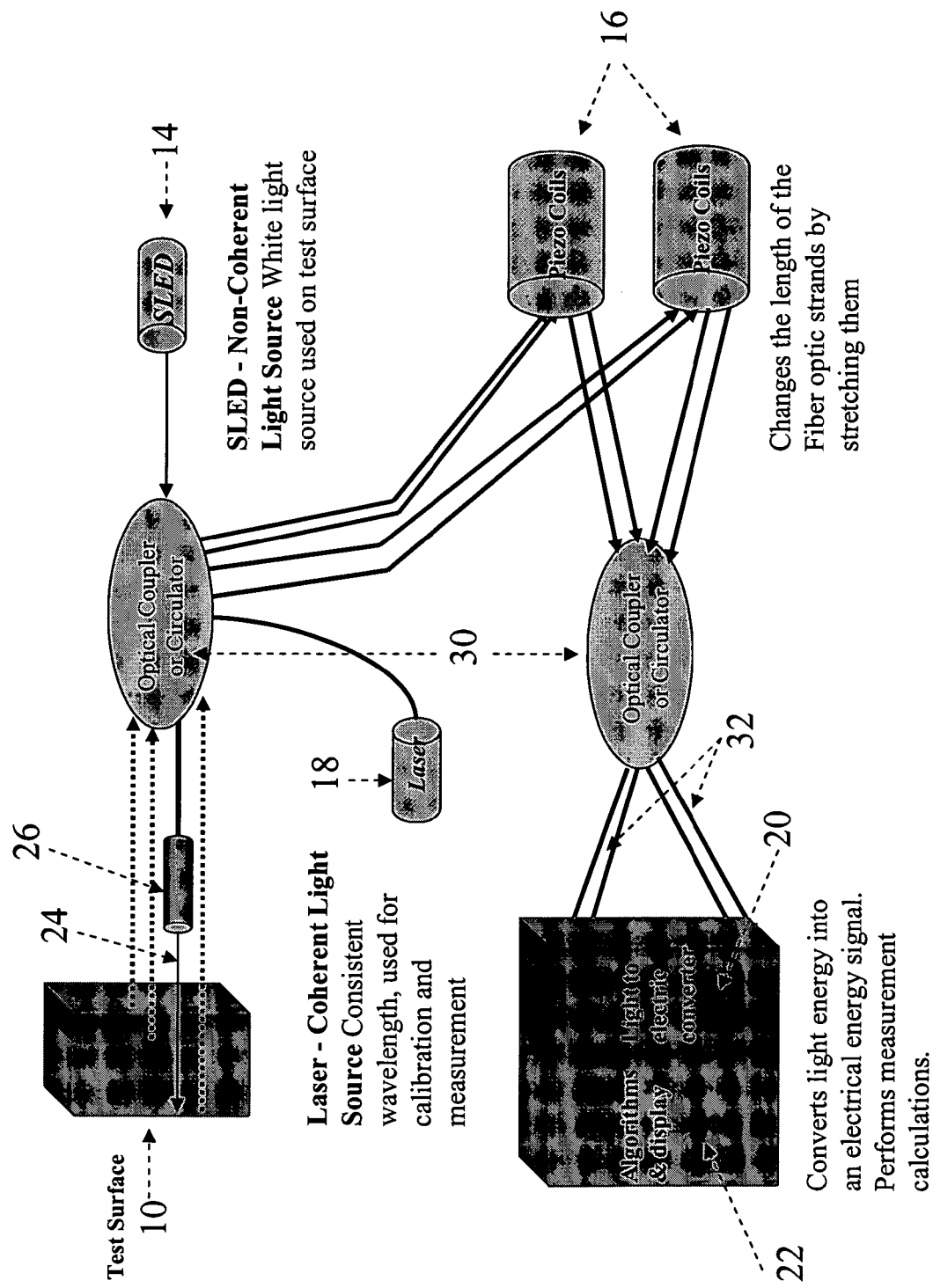
FIG. 17 and the preferred embodiment depicted therein, shows a graphical representation of the major components of the measurement and inspection system, and the path of light and electric signals to and from the test surface and through to the resulting end measurements, in accordance with the present invention.

As shown in FIG. 17, and the preferred embodiment depicted therein, an optical probe (26) directs light from a non-coherent light source, the SLED (14) towards a test surface (10). Non-coherent light is light that has a wavelength that does not retain a consistent pattern over time. Coherent light sources retain their wavelength pattern for extremely long periods.

As shown in FIG. 17, and the preferred embodiment depicted therein, the light from the SLED (14) is directed through the optical couplers or circulators (30) as required and split to the two piezo electric coils (16) which are "moving" in opposing directions, with one expanding while the other is contracting. This is done through electronic signaling. The opposing direction of the coils increases the scan length by a factor of two.

The light from both the SLED (14) and laser (18) are directed through the coils (16), reflected back through the coils (16) by a Faraday type mirror (not shown), and are then routed to a coupler or circulator (30) type device where the light waves are split again into coherent and non-coherent sources (32) and directed to their respective detectors (not shown). The detectors obtain the signal and then transfer this information to an analog to digital converter board (20) as shown on FIG. 17, and the preferred embodiment depicted therein. The resulting information is then transferred to the Personal Computer (22) where the algorithms translate the information into precise measurements. Alternatively, this conversion and signal processing and algorithm translation can be done within a digital signal-processing unit within the dual interferometer (see FIG. 1).

One way to measure the layers is described in U.S. Pat. No. 6,522,410, (Marcus et al) of which the entire disclosure of these patents is hereby referenced. In this strategy the sub-peaks are analyzed one at a time and the center position is found by performing a Fast Fourier Transform (FFT) of the shifted waveform. A Least Square Fit (LSF) is performed on the FFT phase subset and the true peak location is determined from the phase slope.

In the present invention, a multi step process is performed to determine the peaks of an envelope.
1. Perform a Hilbert transform and obtain the Gaussian envelope.
2. Identify possible peaks, one way is by finding negative slope zero crossings of the derivative.
3. Use a threshold condition to identify the main peaks.
4. Use either a centroid around the peaks, or for more accurate peak position detection, use a peak finding algorithm that involves a second-order polynomial instead of a centroid. Polynomial curve fitting is preferred to centroid due to noise sensitivity.

Figure 18:
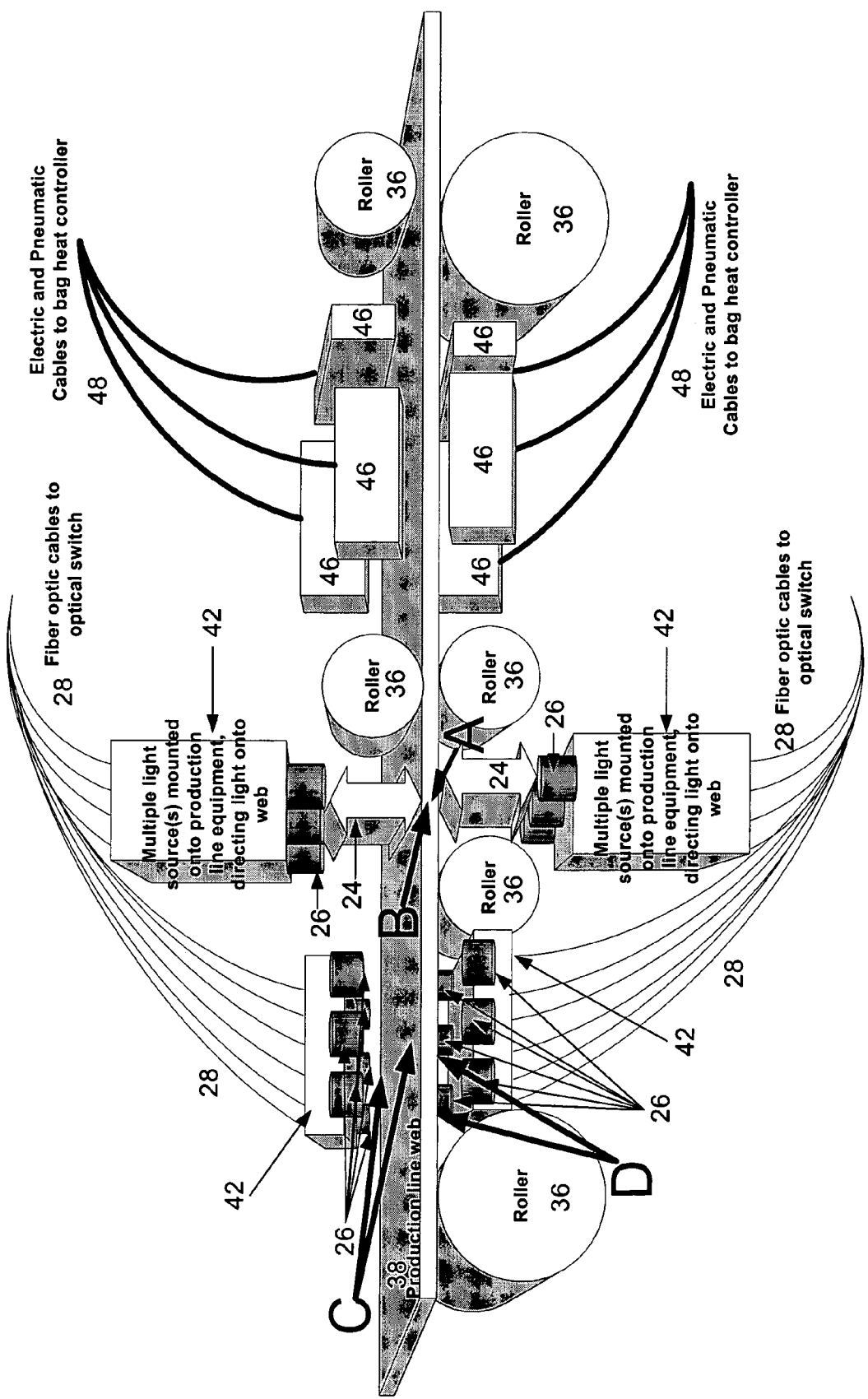
FIG. 18 and the preferred embodiment depicted therein, shows multiple light probe placement in relation to the roller placement and sealer elements along a generic web on a packaging production line.

Specific to a moving web, FIG. 18, and the preferred embodiment depicted therein, represents a flexible packaging production line (not shown) with moving web (38) of no specific width but variable to any size. The production line may be comprised of rollers (36) and a moving web of material (38). The web may move at speeds of a few feet per minute to thousands of feet per minute. The material is consistent within any production line at any one time but the line may contain material of multiple sorts. Heat and pressure platens (46) are used to compress and heat the plastic to form seals along various points within the web. These seals can be affected by temperature, pressure and time to form seals that are good or bad.

In the case of plastic material, an extrusion system may be downstream providing the web. In the case of paper or foil, there may be some sort of extrusion system as well. Points A and B represent two locations that may provide accurate measuring points along the web, for seams across the web. Points C and D represent locations on the sides of the web that may provide accurate measurement on both the top and bottom of the web.

Material of the web may be comprised of transparent, colored, partially opaque or completely opaque material (for example, an optical density less than 4 at the measured wavelength). If material is of a specified optical density only one probe (26) may be used. If the material has a barrier layer with an optical density greater than what may be pierced by the SLED then measurements may be obtained from both the top and bottom of the web as shown in FIG. 18, and the preferred embodiment depicted therein, at points A, B, C, and D. The measurements taken from both the top of the web (B and C) and the bottom (A and D) may then be mathematically combined to calculate the multi-layer thicknesses. Other methods may be apparent for determining these thicknesses, to those experienced in the art, and they are within the scope of the present invention.

FIG. 18, and the preferred embodiment depicted therein, represents multiple probes (26) and light beams (24) represented by the arrows above point B and below point A. The number of probes (26) present may be from 1 to n and are restricted only by the type of optical switch (not shown) that is chosen. The optical switch (not shown) obtains samples from one probe (26) to the next, and the software running the switch may determine the order. Additional probes (26) are provided as indicated by points C and D to sample data points along the sides of the moving web.

By using the switch, the system may sample at an extremely rapid rate. The restrictions are primarily driven by the Analog to Digital card (not shown) within the personal computer (not shown), the rate at which real time data may be processed or by the processing speed if analog to digital processing is done within a digital signal processor (DSP) within the Dual Interferometer, and by the speed of the optical switch. The current Analog to Digital card (not shown) has a sampling rate of up to 10 Kilohertz. Many switches currently sample every 20–40 milliseconds and this rate is expected to increase as optical switches mature. The present invention will accommodate faster sampling and processing as faster components and software become available. This method of obtaining multiple samples across a moving web is unique to this application.

The present invention is unique in that it has the advantage of being able to provide feedback to the manufacturing system in any process when manufacturing pouches, flexible packaging, or any sort of packaged material. As an example, currently, a manual process is employed to adjust temperature, pressure, and time in the manufacture of pouches and packaging and in the sealing of those packages. This process could be automated using feedback instructions from the Dual Interferometer system.

Within the present invention is the ability to employ feedback to the control system. FIG. 18, and the preferred embodiment depicted therein, represents multiple probes (26) where a specific light probe (26) may be associated to a particular area of the sealing system such that as a probe detects an improper measurement it is able to provide feedback to the sealing system to make corrections to that area. This feedback would be provided via software within the personal computer system (not shown). The system is also able to indicate defective packaging products through various manners such as alarms, marks on packages, automatically removing defective product from the line, etc. None of these aspects are shown in the Figures but are considered to be within the scope of the present invention. In other embodiments, the present invention may be used in packaging and sealing of food products, pharmaceuticals, medical and other industries or processes, in a similar manner although its form may differ. System information may be passed via control software or some combination of software and hardware, which is not shown here.

Figure 19:
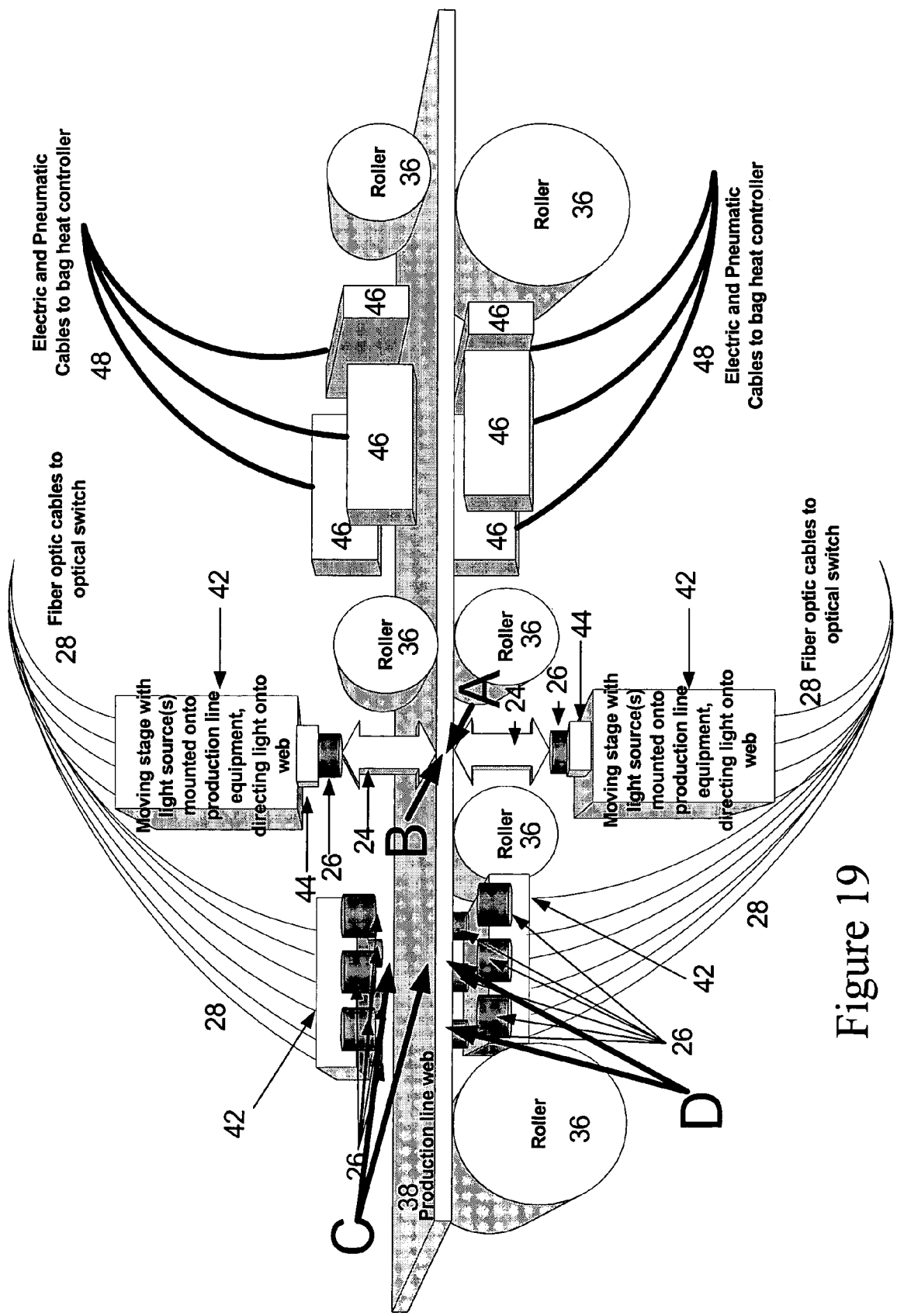
FIG. 19 and the preferred embodiment depicted therein, shows the light probe placement on a moving stage in relation to the roller placement and sealer elements along a generic web on a packaging production line.

FIG. 19, and the preferred embodiment depicted therein, indicates a system where there is a movable stage (44) with a single or multiple probes (26) attached to it that are moved along the web (38) perpendicular to the general movement of the web. In this manner, the described invention provides less points of measurement along the moving web (38) and may provide an averaging algorithm (not shown) to determine the viability of the seal. Points A and B represent the location of the light source in relation to the moving stage (44) and web (38). All other function is the same as described above in the FIG. 18 description.

Figure 20:
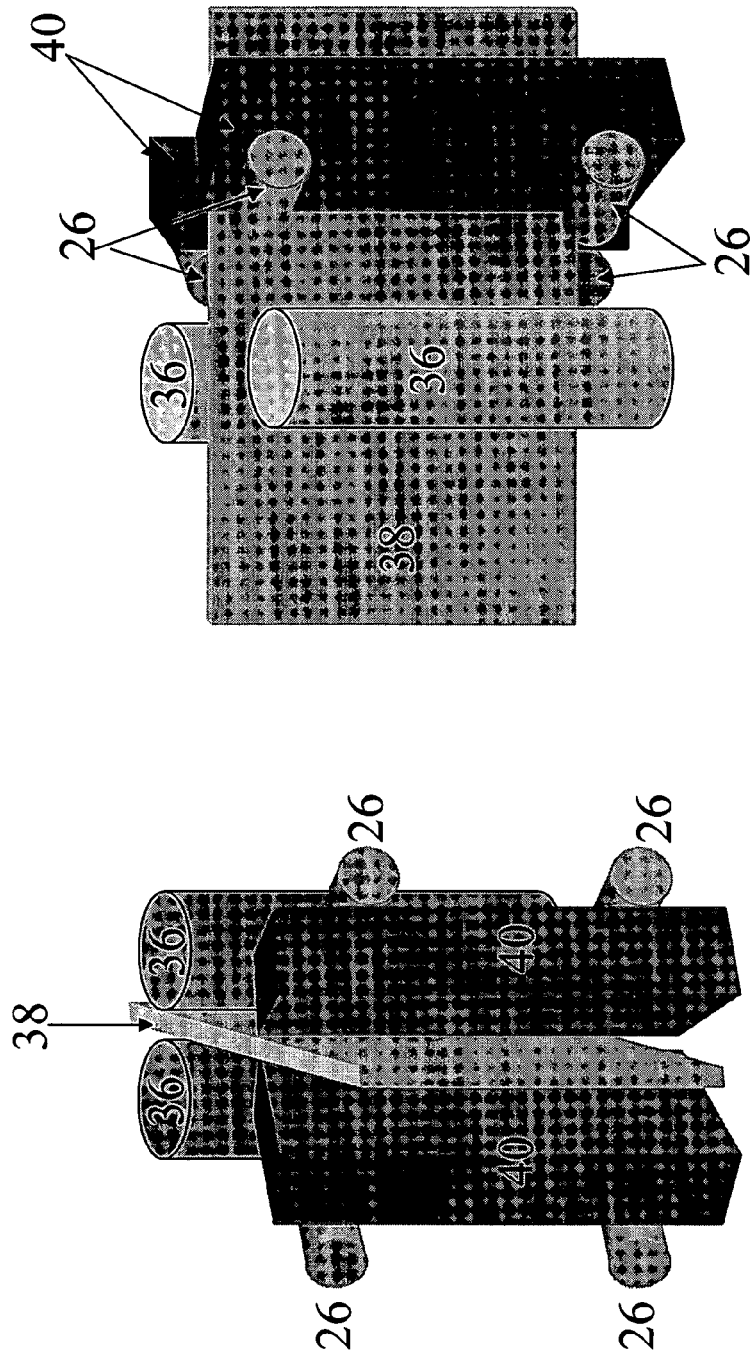
FIG. 20 and the preferred embodiment depicted therein, shows the light probe placement on a moving stage in relation to the roller placement along a generic web on a packaging production line, in the pre-fold and pre-seal stage of production.

FIG. 20 describes a method of measuring the thickness of a moving web prior to the production of a flexible package or pouch. The package or pouch may be constructed of a single sheet of material or multiple sheets of material, or other methods. But, with any manufacturing method, the Dual Interferometer system will be able to accurately measure the validity of the seal. FIG. 20 illustrates the moving web (38), passing multiple probes (26) that are mounted on stages (40). As the moving web passes the probes, information is gathered and then passed to the PC (not shown) and used in calculation of the pre-seal measurement. This measurement is then used in the calculation of the projected post-seal measurements described above for FIGS. 18 and 19 to determine valid or invalid seals.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The various descriptions indicate the scope of the invention, and all changes that come within the meaning and range of equivalents thereof are intended to be embraced therein.

What is claimed is:

1. A system for determining and controlling a thickness of a moving web of material using automatic feedback control, the system comprising:
    a web manufacturing system that controls thicknesses of portions of a web of material during manufacturing of the web of material;
    a transport system that moves the web of material in a first direction along a transport path, wherein the transport system has associated therewith a plurality of measurement regions, wherein the plurality of measurement regions include a first measurement region and a second measurement region;
    at least one light source that provides light toward a plurality of segments of the moving web of material within at least the first measurement region and the second measurement region;
    an interferometer device comprising at least two optical sensors communicably connected to a sampling optical switch, wherein the at least two optical sensors detect a portion of the light reflected from the segments of the moving web of material within the first measurement region and the second measurement region, wherein the optical switch receives the portions of light detected by the at least two optical sensors, and wherein the interferometer device further comprises a light-to-electric converter that generates electrical signals representative of the light received by the optical switch;
    a computing device that receives the converted electrical signals, wherein the computing device uses algorithms to translate the received converted electrical signals into data corresponding to thickness measurements; wherein the computing device generates a control signal in response to the data corresponding to thickness measurements to provide feedback to the web manufacturing system so as to control the thicknesses of the segments of the moving web of material within the first measurement region and the second measurement region during manufacturing of the web of material.

2. The system of claim 1, wherein the thickness measurements provide information regarding integrity of a seal.

3. A system for determining and controlling a thickness of a moving material using automatic feedback control, the system comprising:
    at least one light source that provides light toward a plurality of segments of a moving material within at least a first measurement region and a second measurement region;
    an interferometer device comprising at least two optical sensors communicably connected to a sampling optical switch, wherein the at least two optical sensors detect a portion of the light reflected from the segments of the moving material within the first measurement region and the second measurement region, wherein the optical switch receives the portions of light detected by the at least two optical sensors, and wherein the interferometer device further comprises a light-to-electric converter that generates electrical signals representative of the light received by the optical switch;
    a computing device that receives the converted electrical signals, wherein the computing device uses algorithms to translate the received converted electrical signals into data corresponding to thickness measurements; wherein the computing device generates a control signal in response to the data corresponding to thickness measurements to provide feedback so as to control the thicknesses of the segments of the moving material within the first measurement region and the second measurement region during manufacturing of the moving material.

4. The system of claim 3, wherein the thickness measurements provide information regarding integrity of a seal.

5. The system of claim 3, wherein the at least one light source comprises an SLED.

6. The system of claim 3, wherein the at least one light source comprises a laser.

7. The system of claim 3, wherein the interferometer device comprises two piezo coils which move in opposing directions.

8. The system of claim 3, wherein the algorthim performs the following steps to determine peaks:
    a) perform a Hilbert transform and obtain the Gaussian envelope;
    b) identify possible peaks;
    c) use a threshold condition to identify the main peaks;
    d) use a centroid around the peaks.

9. The system of claim 3, wherein the algorthim performs the following steps to determine peaks:
    a) perform a Hilbert transform and obtain the Gaussian envelope;
    b) identify possible peaks;
    c) use a threshold condition to identify the main peaks;
    d) use a peak finding algorithm that involves a second-order polynomial.

10. The system of claim 3, wherein feedback is provided to heat and pressure platens to control the thicknesses of the segments of the moving material within the first measurement region and the second measurement region during manufacturing of the moving material.

11. The system of claim 3, wherein the first measurement region is on a first surface of the moving material, and wherein the second measurement region is on a second surface of the moving material which is opposite the first surface of the moving material.

12. The system of claim 11, wherein the first surface of the moving material and the second surface of the moving material are located on sides of the moving material.

13. The system of claim 11, wherein information related ot the detected light reflected from the moving material within the first measurement region and the second measurement region are combined to calculate a thickness of the moving material.

14. The system of claim 3, wherein the moving material includes a plurality of layers.

15. The system of claim 3, wherein the moving material comprises pouch material.

16. The system of claim 3, wherein at least one of the at least two optical sensors are provided on a movable stage.

* * * * *